(12) United States Patent
Khachaturian

(10) Patent No.: US 12,495,977 B2
(45) Date of Patent: Dec. 16, 2025

(54) APPARATUS AND METHODS FOR MEASURING BLOOD PRESSURE AND OTHER VITAL SIGNS VIA A FINGER

(71) Applicant: Arc Devices Limited, Dublin (IE)

(72) Inventor: Mark Haig Khachaturian, Palm Beach Gardens, FL (US)

(73) Assignee: Arc Devices Limited, Dublin (IE)

( * ) Notice: Subject to any disclaimer, the term of this patent is extended or adjusted under 35 U.S.C. 154(b) by 0 days.

(21) Appl. No.: 18/259,551

(22) PCT Filed: Jun. 2, 2023

(86) PCT No.: PCT/US2023/024253
§ 371 (c)(1),
(2) Date: Jun. 27, 2023

(87) PCT Pub. No.: WO2023/235546
PCT Pub. Date: Dec. 7, 2023

(65) Prior Publication Data
US 2025/0082215 A1  Mar. 13, 2025

Related U.S. Application Data

(60) Provisional application No. 63/365,818, filed on Jun. 3, 2022.

(51) Int. Cl.
*A61B 5/022* (2006.01)
*A61B 5/00* (2006.01)
*A61B 5/0205* (2006.01)

(52) U.S. Cl.
CPC ...... *A61B 5/02241* (2013.01); *A61B 5/02225* (2013.01); *A61B 5/6826* (2013.01); *A61B 5/02055* (2013.01)

(58) Field of Classification Search
CPC ............ A61B 5/02241; A61B 5/02225; A61B 5/6826; A61B 5/02055
See application file for complete search history.

(56) References Cited

U.S. PATENT DOCUMENTS 4,315,150 A    2/1982  Darringer et al.
4,322,012 A    3/1982  Conti
(Continued)

FOREIGN PATENT DOCUMENTS

CA    2160252        10/1994
CN    1271562 A      11/2000
(Continued)

OTHER PUBLICATIONS

Unknown, "Crit-Line III Monitor", Fresenius Medical Care, retrieved Nov. 17, 2021 from https://fmcna.com/products/fluid-management/crit-line-iii/.
(Continued)

*Primary Examiner* — Jonathan T Kuo

(57) ABSTRACT

There is disclosed a vital sign measuring device and method for obtaining an indication of a person's blood pressure via the person's finger by means of an inflatable measurement bladder adapted to contact only a portion of an underside of a finger defining a finger pad. A structure or other implement applies a downward force on a top portion of the finger opposite the finger pad. Blood pressure may be determined without the use of any electromagnetic radiation, such as miniature dynamic light sensing (mDLS). Apparatuses and methods for obtaining an indication of other vital signs, including hematocrit and total protein, are also disclosed.

25 Claims, 15 Drawing Sheets

(56) References Cited

U.S. PATENT DOCUMENTS

| | | |
|---|---|---|
| 4,394,773 A | 7/1983 | Ruell |
| 4,602,642 A | 7/1986 | O'Hara et al. |
| 4,634,294 A | 1/1987 | Christol et al. |
| 4,709,690 A | 12/1987 | Haber |
| 4,797,840 A | 1/1989 | Fraden |
| 5,017,018 A | 5/1991 | Iuchi et al. |
| 5,067,162 A | 11/1991 | Driscoll, Jr. et al. |
| 5,077,476 A | 12/1991 | Rosenthal |
| 5,133,605 A | 7/1992 | Nakamura |
| 5,150,969 A | 9/1992 | Goldberg et al. |
| 5,272,340 A | 12/1993 | Anbar |
| 5,325,442 A | 6/1994 | Knapp |
| 5,351,303 A | 9/1994 | Willmore |
| 5,368,038 A | 11/1994 | Fraden |
| 5,398,681 A | 3/1995 | Kupershmidt |
| 5,404,879 A | 4/1995 | Frankenreiter |
| 5,499,627 A | 3/1996 | Steuer et al. |
| 5,689,576 A | 11/1997 | Schneider et al. |
| 5,737,439 A | 4/1998 | Lapsley et al. |
| 5,743,644 A | 4/1998 | Kobayashi |
| 5,909,501 A | 6/1999 | Thebaud |
| 5,940,526 A | 8/1999 | Setlak et al. |
| 5,953,441 A | 9/1999 | Setlak |
| 6,001,066 A | 12/1999 | Canfield et al. |
| 6,095,682 A | 8/2000 | Hollander et al. |
| 6,118,890 A | 9/2000 | Senior |
| 6,134,340 A | 10/2000 | Hsu et al. |
| 6,213,952 B1 | 4/2001 | Finarov et al. |
| 6,241,288 B1 | 6/2001 | Bergenek et al. |
| 6,266,546 B1 | 7/2001 | Steuer et al. |
| 6,286,994 B1 | 9/2001 | Boesel et al. |
| 6,289,114 B1 | 9/2001 | Mainguet |
| 6,292,685 B1 | 9/2001 | Pompei |
| 6,327,376 B1 | 12/2001 | Harkin |
| 6,343,141 B1 | 1/2002 | Okada et al. |
| 6,358,216 B1 | 3/2002 | Kraus et al. |
| 6,445,938 B1 | 9/2002 | Berman et al. |
| 6,483,929 B1 | 11/2002 | Murakami et al. |
| 6,505,059 B1 | 1/2003 | Kollias et al. |
| 6,546,122 B1 | 4/2003 | Russo |
| 6,560,352 B2 | 5/2003 | Rowe et al. |
| 6,587,701 B1 | 7/2003 | Stranc et al. |
| 6,728,560 B2 | 4/2004 | Kollias et al. |
| 6,742,927 B2 | 6/2004 | Bellifemine |
| 6,751,342 B2 | 6/2004 | Shepard |
| 6,757,412 B1 | 6/2004 | Parsons |
| 6,819,950 B2 | 11/2004 | Mills |
| 6,832,000 B2 | 12/2004 | Herman et al. |
| 7,092,376 B2 | 8/2006 | Schuman |
| 7,138,905 B2 | 11/2006 | Pavlidis et al. |
| 7,140,768 B2 | 11/2006 | Prabhakar |
| 7,214,953 B2 | 5/2007 | Setlak et al. |
| 7,321,701 B2 | 1/2008 | Setlak et al. |
| 7,335,163 B2 | 2/2008 | Lam et al. |
| 7,339,685 B2 | 3/2008 | Carlson et al. |
| 7,346,386 B2 | 3/2008 | Pompei |
| 7,351,974 B2 | 4/2008 | Setlak |
| 7,358,514 B2 | 4/2008 | Setlak et al. |
| 7,358,515 B2 | 4/2008 | Setlak et al. |
| 7,361,919 B2 | 4/2008 | Setlak |
| 7,433,729 B2 | 10/2008 | Setlak et al. |
| 7,520,668 B2 | 4/2009 | Chen |
| 7,572,056 B2 | 8/2009 | Lane |
| 7,601,123 B2 | 10/2009 | Tweed et al. |
| 7,671,351 B2 | 3/2010 | Setlak et al. |
| 7,787,938 B2 | 8/2010 | Pompei |
| 7,915,601 B2 | 3/2011 | Setlak et al. |
| 8,194,942 B2 | 6/2012 | Tobe et al. |
| 8,213,689 B2 | 7/2012 | Yagnik et al. |
| 8,249,547 B1 | 8/2012 | Fellner |
| 8,401,285 B1 | 3/2013 | Rezaee et al. |
| 8,452,382 B1 | 5/2013 | Roth |
| 8,486,106 B2 * | 7/2013 | Warburton ........... A61B 17/132 606/203 |
| 8,493,482 B2 | 7/2013 | Cote et al. |
| 8,517,603 B2 | 8/2013 | Fraden |
| 8,527,038 B2 | 9/2013 | Moon et al. |
| 8,617,081 B2 | 12/2013 | Mestha et al. |
| 8,693,739 B2 | 4/2014 | Weng et al. |
| 8,814,800 B2 | 8/2014 | Fortin et al. |
| 8,849,379 B2 | 9/2014 | Abreu |
| 9,008,458 B2 | 4/2015 | Pack |
| 9,321,394 B2 | 4/2016 | Bouffay et al. |
| 9,433,360 B2 | 9/2016 | Lam et al. |
| 9,442,065 B2 | 9/2016 | Gulati et al. |
| 9,497,534 B2 | 11/2016 | Prest et al. |
| 10,039,500 B2 | 8/2018 | Newberry |
| 10,485,431 B1 | 11/2019 | Khachaturian et al. |
| 10,492,684 B2 | 12/2019 | Khachaturian et al. |
| 10,874,307 B2 | 12/2020 | Narasimhan et al. |
| 2001/0005424 A1 | 6/2001 | Marksteiner |
| 2002/0067845 A1 | 6/2002 | Griffis |
| 2002/0076089 A1 | 6/2002 | Muramatsu et al. |
| 2002/0077850 A1 | 6/2002 | McMenimen et al. |
| 2002/0138768 A1 | 9/2002 | Murakami et al. |
| 2002/0143257 A1 | 10/2002 | Newman et al. |
| 2002/0172410 A1 | 11/2002 | Shepard |
| 2003/0069486 A1 | 4/2003 | Sueppel et al. |
| 2003/0069487 A1 | 4/2003 | Mortara |
| 2003/0078622 A1 | 4/2003 | Cansell et al. |
| 2003/0123714 A1 | 7/2003 | O'Gorman et al. |
| 2003/0126448 A1 | 7/2003 | Russo |
| 2003/0169910 A1 | 9/2003 | Reisman et al. |
| 2003/0190062 A1 | 10/2003 | Noro et al. |
| 2004/0013162 A1 | 1/2004 | Beerwerth |
| 2004/0019293 A1 | 1/2004 | Schweitzer et al. |
| 2004/0097818 A1 | 5/2004 | Schmid et al. |
| 2004/0116822 A1 | 6/2004 | Lindsey |
| 2004/0120383 A1 | 6/2004 | Kennedy et al. |
| 2004/0153341 A1 | 8/2004 | Brandt et al. |
| 2004/0186357 A1 | 9/2004 | Soderberg et al. |
| 2004/0193068 A1 | 9/2004 | Burton et al. |
| 2005/0023991 A1 | 2/2005 | Kemper |
| 2005/0054908 A1 | 3/2005 | Blank et al. |
| 2005/0203350 A1 | 9/2005 | Beck |
| 2005/0206518 A1 | 9/2005 | Welch et al. |
| 2005/0209515 A1 | 9/2005 | Hockersmith et al. |
| 2005/0288571 A1 | 12/2005 | Perkins et al. |
| 2006/0004271 A1 | 1/2006 | Peyser et al. |
| 2006/0030759 A1 | 2/2006 | Weiner et al. |
| 2006/0045316 A1 | 3/2006 | Hauke et al. |
| 2006/0089668 A1 * | 4/2006 | Warburton ........... A61B 17/132 606/203 |
| 2006/0110015 A1 | 5/2006 | Rowe |
| 2006/0155589 A1 | 7/2006 | Lane et al. |
| 2006/0195024 A1 | 8/2006 | Benni |
| 2006/0209631 A1 | 9/2006 | Melese et al. |
| 2006/0225737 A1 | 10/2006 | Lobbi |
| 2006/0238333 A1 | 10/2006 | Welch et al. |
| 2006/0278293 A1 | 12/2006 | Weber et al. |
| 2006/0293921 A1 | 12/2006 | McCarthy et al. |
| 2007/0013511 A1 | 1/2007 | Weiner et al. |
| 2007/0049834 A1 | 3/2007 | Tao et al. |
| 2007/0069887 A1 | 3/2007 | Welch et al. |
| 2007/0080233 A1 | 4/2007 | Forster et al. |
| 2007/0135866 A1 | 6/2007 | Baker et al. |
| 2007/0142731 A1 | 6/2007 | Ye et al. |
| 2007/0183475 A1 | 8/2007 | Hutcherson |
| 2007/0185390 A1 | 8/2007 | Perkins et al. |
| 2007/0189358 A1 | 8/2007 | Lane et al. |
| 2007/0265533 A1 | 11/2007 | Tran |
| 2008/0033308 A1 | 2/2008 | Cen et al. |
| 2008/0064967 A1 | 3/2008 | Ide |
| 2008/0149701 A1 | 6/2008 | Lane |
| 2008/0175301 A1 | 7/2008 | Chen |
| 2008/0281167 A1 | 11/2008 | Soderberg et al. |
| 2008/0281168 A1 | 11/2008 | Gibson et al. |
| 2008/0300473 A1 | 12/2008 | Benni |
| 2009/0062674 A1 | 3/2009 | Jin et al. |
| 2009/0100333 A1 | 4/2009 | Xiao |
| 2009/0103469 A1 | 4/2009 | Smith et al. |
| 2009/0105549 A1 | 4/2009 | Smith et al. |
| 2009/0105566 A1 | 4/2009 | Smith et al. |
| 2009/0105567 A1 | 4/2009 | Smith et al. |

(56) References Cited

U.S. PATENT DOCUMENTS

| | | |
|---|---|---|
| 2009/0131774 A1 | 5/2009 | Sweitzer et al. |
| 2009/0141124 A1 | 6/2009 | Liu et al. |
| 2009/0172591 A1 | 7/2009 | Pomper |
| 2009/0175317 A1 | 7/2009 | Chan et al. |
| 2009/0177248 A1 | 7/2009 | Roberts |
| 2009/0182526 A1 | 7/2009 | Quinn et al. |
| 2009/0196475 A1 | 8/2009 | Demirli et al. |
| 2009/0221880 A1 | 9/2009 | Soderberg et al. |
| 2010/0049077 A1 | 2/2010 | Sadleir et al. |
| 2010/0056928 A1 | 3/2010 | Zuzak |
| 2010/0094098 A1 | 4/2010 | Smith et al. |
| 2010/0094145 A1 | 4/2010 | Ye et al. |
| 2010/0121164 A1 | 5/2010 | Donars et al. |
| 2010/0191472 A1 | 7/2010 | Doniger et al. |
| 2010/0265986 A1 | 10/2010 | Mullin et al. |
| 2010/0280331 A1 | 11/2010 | Kaufman et al. |
| 2010/0284436 A1 | 11/2010 | Lane et al. |
| 2010/0298650 A1 | 11/2010 | Moon et al. |
| 2010/0322282 A1 | 12/2010 | Lane et al. |
| 2010/0324380 A1 | 12/2010 | Perkins et al. |
| 2011/0047298 A1 | 2/2011 | Eaton et al. |
| 2011/0054267 A1 | 3/2011 | Fidacaro et al. |
| 2011/0112791 A1 | 5/2011 | Pak et al. |
| 2011/0121978 A1 | 5/2011 | Schwörer et al. |
| 2011/0140896 A1 | 6/2011 | Menzel |
| 2011/0148622 A1 | 6/2011 | Judy et al. |
| 2011/0152629 A1 | 6/2011 | Eaton et al. |
| 2011/0158283 A1 | 6/2011 | Meyerson et al. |
| 2011/0178376 A1 | 7/2011 | Judy et al. |
| 2011/0199203 A1 | 8/2011 | Hsu |
| 2011/0228810 A1 | 9/2011 | O'Hara et al. |
| 2011/0228811 A1 | 9/2011 | Fraden |
| 2011/0230731 A1 | 9/2011 | Rantala et al. |
| 2011/0237906 A1 | 9/2011 | Kabakov |
| 2011/0251493 A1 | 10/2011 | Poh et al. |
| 2011/0276698 A1 | 11/2011 | Bigioi et al. |
| 2011/0282168 A1 | 11/2011 | Weiss et al. |
| 2011/0285248 A1 | 11/2011 | Cewers |
| 2011/0286644 A1 | 11/2011 | Kislal |
| 2011/0291837 A1 | 12/2011 | Rantala |
| 2011/0291838 A1 | 12/2011 | Rantala |
| 2012/0004516 A1 | 1/2012 | Eng et al. |
| 2012/0005248 A1 | 1/2012 | Garudadri et al. |
| 2012/0022348 A1 | 1/2012 | Droitcour et al. |
| 2012/0026119 A1 | 2/2012 | Judy et al. |
| 2012/0053422 A1 | 3/2012 | Rantala |
| 2012/0094600 A1 | 4/2012 | DelloStritto et al. |
| 2012/0096367 A1 | 4/2012 | DelloStritto et al. |
| 2012/0130197 A1 | 5/2012 | Kugler et al. |
| 2012/0130251 A1 | 5/2012 | Huff |
| 2012/0130252 A1 | 5/2012 | Pohjanen et al. |
| 2012/0136559 A1 | 5/2012 | Rothschild |
| 2012/0150482 A1 | 6/2012 | Yildizyan et al. |
| 2012/0154152 A1 | 6/2012 | Rantala et al. |
| 2012/0165617 A1 | 6/2012 | Vesto et al. |
| 2012/0179011 A1 | 7/2012 | Moon et al. |
| 2012/0242844 A1 | 9/2012 | Walker et al. |
| 2012/0271130 A1 | 10/2012 | Benni |
| 2012/0302905 A1 | 11/2012 | Kaski |
| 2012/0319848 A1 | 12/2012 | Coffeng |
| 2013/0002420 A1 | 1/2013 | Perkins et al. |
| 2013/0006093 A1 | 1/2013 | Raleigh et al. |
| 2013/0023772 A1 | 1/2013 | Kinsley et al. |
| 2013/0035599 A1 | 2/2013 | De Bruijn et al. |
| 2013/0053655 A1 | 2/2013 | Castellanos |
| 2013/0085348 A1 | 4/2013 | Devenyi et al. |
| 2013/0085708 A1 | 4/2013 | Sattler |
| 2013/0085758 A1 | 4/2013 | Csoma et al. |
| 2013/0086122 A1 | 4/2013 | Devenyi et al. |
| 2013/0109927 A1 | 5/2013 | Menzel |
| 2013/0109929 A1 | 5/2013 | Menzel |
| 2013/0137939 A1 | 5/2013 | He et al. |
| 2013/0138003 A1 | 5/2013 | Kaski |
| 2013/0172770 A1 | 7/2013 | Muehlsteff |
| 2013/0178719 A1 | 7/2013 | Balji et al. |
| 2013/0211265 A1 | 8/2013 | Bedingham et al. |
| 2013/0215928 A1 | 8/2013 | Bellifemine |
| 2013/0245457 A1 | 9/2013 | Kinsley et al. |
| 2013/0245462 A1 | 9/2013 | Capdevila et al. |
| 2013/0245467 A1 | 9/2013 | St. Pierre et al. |
| 2013/0245488 A1 | 9/2013 | Quinn et al. |
| 2013/0245489 A1 | 9/2013 | Mullin et al. |
| 2013/0265327 A1 | 10/2013 | Vann et al. |
| 2013/0267792 A1 | 10/2013 | Petersen et al. |
| 2013/0267793 A1 | 10/2013 | Meador et al. |
| 2013/0267861 A1 | 10/2013 | Vassallo et al. |
| 2013/0267873 A1 | 10/2013 | Fuchs |
| 2013/0268283 A1 | 10/2013 | Vann et al. |
| 2013/0271283 A1 | 10/2013 | Judy et al. |
| 2013/0271591 A1 | 10/2013 | Van Leest et al. |
| 2013/0296716 A1 | 11/2013 | Kurzenberger |
| 2013/0307536 A1 | 11/2013 | Feng et al. |
| 2013/0322729 A1 | 12/2013 | Mestha et al. |
| 2013/0334298 A1 | 12/2013 | Sakpal et al. |
| 2013/0342691 A1 | 12/2013 | Lewis et al. |
| 2014/0003461 A1 | 1/2014 | Roth |
| 2014/0003462 A1 | 1/2014 | Roth |
| 2014/0031637 A1 | 1/2014 | Fidacaro et al. |
| 2014/0032241 A1 | 1/2014 | Coffeng |
| 2014/0058213 A1 | 2/2014 | Abu-Tarif et al. |
| 2014/0064327 A1 | 3/2014 | Roth |
| 2014/0064328 A1 | 3/2014 | Roth |
| 2014/0064333 A1 | 3/2014 | Roth |
| 2014/0072190 A1 | 3/2014 | Wu et al. |
| 2014/0072228 A1 | 3/2014 | Rubinstein |
| 2014/0072229 A1 | 3/2014 | Wadhwa |
| 2014/0073860 A1 | 3/2014 | Uriti |
| 2014/0088434 A1 | 3/2014 | Roth |
| 2014/0088435 A1 | 3/2014 | Roth |
| 2014/0088436 A1 | 3/2014 | Roth |
| 2014/0088446 A1 | 3/2014 | St. Pierre et al. |
| 2014/0112367 A1 | 4/2014 | Roth |
| 2014/0114600 A1 | 4/2014 | Roth |
| 2014/0121481 A1 | 5/2014 | Abrams et al. |
| 2014/0155759 A1 | 6/2014 | Kaestle et al. |
| 2014/0171805 A1 | 6/2014 | Mullin et al. |
| 2014/0189576 A1 | 7/2014 | Carmi |
| 2014/0221766 A1 | 8/2014 | Kinast |
| 2014/0221796 A1 | 8/2014 | Lia et al. |
| 2014/0232516 A1 | 8/2014 | Stivoric et al. |
| 2014/0235963 A1 | 8/2014 | Edwards et al. |
| 2014/0247058 A1 | 9/2014 | Mortara |
| 2014/0253709 A1 | 9/2014 | Bresch et al. |
| 2014/0321505 A1 | 10/2014 | Rill et al. |
| 2014/0330098 A1 | 11/2014 | Merritt et al. |
| 2014/0331298 A1 | 11/2014 | Baker et al. |
| 2015/0025344 A1 | 1/2015 | Benni |
| 2015/0036350 A1 | 2/2015 | Palikaras et al. |
| 2015/0045663 A1 | 2/2015 | Palikaras et al. |
| 2015/0073828 A1 | 3/2015 | Mortara et al. |
| 2015/0077268 A1 | 3/2015 | Lane et al. |
| 2015/0088538 A1 | 3/2015 | Dykes et al. |
| 2015/0110153 A1 | 4/2015 | Hoblit et al. |
| 2015/0126847 A1 | 5/2015 | Balji et al. |
| 2015/0157275 A1 | 6/2015 | Swamy et al. |
| 2015/0182114 A1 | 7/2015 | Wang et al. |
| 2015/0201872 A1 | 7/2015 | Benni |
| 2015/0257653 A1 | 9/2015 | Hyde et al. |
| 2015/0265159 A1 | 9/2015 | Lane et al. |
| 2015/0272452 A1 | 10/2015 | Mullin et al. |
| 2015/0308946 A1 | 10/2015 | Duffy et al. |
| 2015/0327811 A1 | 11/2015 | Mortara |
| 2015/0339805 A1 | 11/2015 | Ohba |
| 2016/0000335 A1 | 1/2016 | Khachaturian et al. |
| 2016/0007922 A1 | 1/2016 | Sen et al. |
| 2016/0035084 A1 | 2/2016 | Khachaturian et al. |
| 2016/0051171 A1 | 2/2016 | Pikov et al. |
| 2016/0136367 A1 | 5/2016 | Varney |
| 2016/0150978 A1 | 6/2016 | Yuen et al. |
| 2016/0157739 A1 | 6/2016 | Peeters et al. |
| 2016/0302666 A1 | 10/2016 | Shaya et al. |
| 2016/0361002 A1 | 12/2016 | Palikaras et al. |
| 2017/0238816 A1 | 8/2017 | Nakazawa et al. |
| 2019/0099095 A1* | 4/2019 | Zhang .......... A61B 5/02141 |

(56) References Cited

U.S. PATENT DOCUMENTS

| | | | |
|---|---|---|---|
| 2019/0167195 A1 | 6/2019 | Axelrod et al. | |
| 2019/0328329 A1* | 10/2019 | Settels | A61B 5/02438 |
| 2019/0336016 A1 | 11/2019 | Zhao et al. | |
| 2019/0336077 A1 | 11/2019 | Kuhn et al. | |
| 2019/0350470 A1 | 11/2019 | Khachaturian et al. | |
| 2021/0307633 A1 | 10/2021 | Weber et al. | |
| 2021/0369126 A1 | 12/2021 | Khachaturian | |
| 2022/0087555 A1 | 3/2022 | Shih et al. | |

FOREIGN PATENT DOCUMENTS

| | | |
|---|---|---|
| CN | 102198004 A | 9/2011 |
| CN | 202619644 U | 4/2013 |
| CN | 202859096 U | 4/2013 |
| CN | 203861234 U | 10/2014 |
| CN | 105662434 A | 4/2016 |
| CN | 105919601 A | 9/2016 |
| CN | 206342477 U | 7/2017 |
| CN | 206443702 U | 8/2017 |
| DE | 19827343 A1 | 12/1999 |
| EP | 0404562 A2 | 11/1991 |
| EP | 0537383 A1 | 4/1993 |
| EP | 0630203 B1 | 12/1994 |
| EP | 2045590 A1 | 4/2009 |
| EP | 2380493 A1 | 10/2011 |
| EP | 2674735 A1 | 12/2013 |
| EP | 2836107 A1 | 2/2015 |
| GB | 2291498 A | 1/1996 |
| GB | 2500719 A1 | 10/2013 |
| GB | 2521620 A | 1/2015 |
| GB | 2523741 A | 9/2015 |
| JP | 2002527136 A | 8/2002 |
| WO | 1992002792 A1 | 2/1992 |
| WO | 1998001730 A1 | 1/1998 |
| WO | 1999039166 A1 | 8/1999 |
| WO | 1999067611 A1 | 12/1999 |
| WO | 2000021437 A3 | 7/2001 |
| WO | 2005024710 A1 | 3/2005 |
| WO | 2005024712 A1 | 3/2005 |
| WO | 2005078636 A3 | 1/2006 |
| WO | 2008053474 A2 | 5/2008 |
| WO | 2011013132 A1 | 2/2011 |
| WO | 2011063266 A2 | 5/2011 |
| WO | 2012093311 A1 | 7/2012 |
| WO | 2013144559 A1 | 10/2013 |
| WO | 2013144652 A1 | 10/2013 |
| WO | 2014082071 A1 | 5/2014 |
| WO | 2015049268 A1 | 4/2015 |
| WO | 2015128657 A1 | 9/2015 |
| WO | 2015154105 A1 | 10/2015 |
| WO | 2016005050 A1 | 1/2016 |
| WO | 2016040540 A1 | 3/2016 |
| WO | 2016054079 A1 | 4/2016 |
| WO | 2016120870 A1 | 8/2016 |
| WO | 2017120615 A3 | 7/2017 |
| WO | 2017125397 A1 | 7/2017 |

OTHER PUBLICATIONS

Kim, Harry, International Search Report and Written Opinion by the US International Searching Authority regarding PCT/US2134164, Sep. 8, 2021, 12 pages.

Pitzer et al., Detection of Hypoglycemia With the 3 GlucoWatch Biographer, Diabetes Care, vol. 24, No. 5, May 2001, pp. 881-885, retrieved from the nternet from http://citeseerx.isl.psu.edu/viewdoc/download?doi=10.1.1.915.1360&rep=rep1 &type=pdf on Nov. 9, 2018.

Balakrishnan, Guha, Fredo Durand, and John Guttag. "Detecting pulse from head motions in video." Computer Vision and Pattern Recognition (CVPR), 2013 IEEE Conference on. IEEE, 2013.

Islam, S. M. R., et al., "Internet ofThings for Health Care: A Comprehensive Survey", Jun. 1, 2015, Digital Object dentifier 10.1109/ACCESS.2015.2437951, IEEE Access vol. 3, 2015, retrieved from the Internet on Oct. 1, 2018.

Hassanalieragh Moon, et al., Health Monitoring and Management Using Internet--0f-Things (IoT) Sensing with Cloud-based Processing: Opportunities and Challenges, 2015 IEEE International Conference on Services Computing, pp. 285-292, 978-1-4673-7281-7/15, DOI 10.1109/SCC.2015.47, retrieved from the Internet on Oct. 1, 2018.

Covidien, Filac 3000 EZ-EZA Electronic Thermometer Operating Manual, 2012, http://www.covidien.com/mageServer.aspx?contenlID=31819&contenttype=application/pdf, retrieved from the Internet on Jul. 24, 2015.

Gravina et al., Multi-Sensor Fusion in Body Sensor Networks: State-of-the-art and research challenges, DOI: 10.1016/j.inffus.2016.09.005, Information Fusion, Sep. 13, 2016, retrieved from the Internet on Oct. 1, 2018 at https://www.researchgate.net/publication/308129451.

Klonoff, David C., Noninvasive Blood Glucose Monitoring, Diabetes Care, vol. 20, No. 3, Mar. 1997, pp. 133-437, DOI: 10.2337/diacare.20.3.433, Source: PubMed, retrieved from the Internet on Oct. 2, 2018.

Rossetti et el., Estimating Plasma Glucose from Interstitial Glucose: The Issue of Calibration Algorithms in Commercial Continuous Glucose Monitoring Devices, Sensors 2010, 10, 10936-10952; doi:10.3390/s101210936, SSN 1424-8220, retrieved from www.mdpi.com/journal/sensors on Oct. 2, 2018.

Gautama, T. and Van Hulle, M., "A phase-based approach to the estimation of the optical flow field using spatial Iltering", Neural Nellvorks, IEEE Transactions, 13(5): 1127-1136 (Sep. 2002).

Vole, "Non-Invasive Glucose Monitoring Patent Landscape", KnowMade, 2405 route des Dolines, 06902 Sophia Antipolis, France, Tel: +33 489 89 16 20, http://www.knowmade.com, retrieved from the Internet on Oct. 2, 2018, published Sep. 2015.

Berger, Andrew J., Multicomponent blood analysis by near-infrared Raman spectroscopy, Applied Optics, vol. 38, No. 13, May 1, 1999, pp. 2916-2926, retrieved from the Internet on Oct. 2, 2018.

Darwish et al., Wearable and Implantable Wireless Sensor Network Solutions for Healthcare Monitoring, Sensors 2011, 11, 5561-5595; doi:10.3390/s110605561, ISSN 1424-8220, retrieved from www.mdpi.com/journal/sensors on Oct. 2, 2018.

Oiver et al., Glucose sensors: a review of current and emerging technology, Diabetic Medicine, 26, pp. 197-210, 2009 Diabetes UK, retrieved from https://onlinelibrary.wiley.com/doi/epdf/10.1111/j.1464-5491.2008.02642.x on Oct. 2, 2018.

Jurik, Andrew D. et al., Remote Medical Monitoring, University of Virginia, retrieved from http://www.cs.virginia.edu/urik/docs/jurik-rmm-2008.pdf on Oct. 1, 2018.

Tura, Andrea et al., A Low Frequency Electromagnetic Sensor for Indirect Measurement of Glucose Concentration: In Vitro Experiments in Different Conductive Solutions, Sensors 2010, 10, 5346-5358; doi:10.3390/s100605346, ISSN 1424-8220, retrieved from www.mdpi.com/journal/sensors on Oct. 2, 2018.

Rubinstein, M., et al., "Motion denoising with application to lime-lapse photography," IEEE Computer Vision and Pattern Recognition, CVPR, pp. 313-320 (Jun. 2011).

Pfotzner, Andreas et al., Evaluation of System Accuracy of the GlucoMen LX Plus Blood Glucose Monitoring System With Reference to ISO 15197:2013, Journal of Diabetes Science and Technology 2016, vol. 10(2) 618-619, Diabetes Technology Society, DOI: 10.1177/1932296815613803, retrieved from https://www.ncbi.nlm.nih.gov/pmc/~rticles/PMC4 773971 /pdf/10 .1177 1932296815613803 .pdf on Nov. 2, 2018.

Poveda, Carlos G. Juan, Fundamentals of Microwave , Technology for Non-Invasive Blood Glucose Monitoring And Review of the Most Significant Works Developed, Revista Doctorado UMH vol. 1, n°1, 2015—Articulo p. 6, PhD Program on Industrian and Telecommunication Technologies {TECNIT) nBio Research Group at Systems Engineering Department, Miguel Hernandez University, Elche, Spain, Apr. 2015, retrieved from https://www.researchgate.net/publication/298715332 on Nov. 2, 2018.

Timoner Samson J., and Dennis M. Freeman. "Multi-image gradient-based algorithms for motion estimation." Optical engineering 40.9 (2001): 2003-2016.

(56) References Cited

OTHER PUBLICATIONS

Saha et al., A Glucose Sensing System Based on Transmission Measurements at Millimetre Waves using Micro strip Patch Antennas, Scientific Reports, 7: 6855, DOI: 10.1038/s41598-017-06926-1, Jul. 31, 2017, retrieved from https://www.ncbi.nlm.nih.gov/pmc/articles/PMC5537249/pdf/41598_2017 Article_6926.pdf on Nov. 2, 2018.

Verkruysse, Wim, Lars O. Svaasand, and J_ Stuart Nelson. "Remote plethysmographic imaging using ambient ighl." Optics express 16.26 (2008): 21434-21445.

Todd, Catherine, et al., Towards Non-Invasive Extraction and Determination of Blood Glucose Levels, Bioengineering 2017, 4, 82, Sep. 27, 2017, retrieved from https://www.ncbi.nlm.nih.gov/pmc/articles/PMC5746749/pdf/bioengineering-04-00082.pdf on Nov. 2, 2018.

Pfotzner, Andreas, Advances in Patient Self-Monitoring of Blood Glucose. Journal of Diabetes Science and Technology, DOI: 10.1177/1932296815619183, retrieved from retrieved from www.mdpi.com/journal/sensors on Nov. 2, 2018.

Stankovic, John A., Wireless Sensor Networks, Department of Computer Science, University of Virginia Charlottesville, Virginia 22904, Jun. 19, 2006, retrieved from https://www.cs.virginia.edu/-slankovic/psfiles/wsn.pdf on Oct. 1, 2018.

Wang J., et al., "The cartoon animation filter," ACM Trans. Graph., 25: 1169-1173 (2006).

Lai, Xiaochen et al., A Survey of Body Sensor Networks, Sensors 2013, 13, 5406-5447; doi:10.3390/s130505406, ISSN 1424-8220, retrieved from www.mdpi.com/journal/sensors on Oct. 1, 2018.

Bruen et al., Glucose Sensing for Diabetes Monitoring: Recent Developments, Sensors DOI:10.3390/s17081866,Aug. 12, 2017, retrieved from https://pdfs.semanticscholar.org/9a8b/8f1abdd11eae279204c81dbb5525fe473106.pdf?_ga=2.60896047.2075682402.1541162314-1823527149.1541162314 on Nov. 2, 2018.

Facchinetti, Andrea, Continuous Glucose Monitoring Sensors: Past, Present and Future Algorithmic Challenges, Sensors 2016, 16(12), 2093; https://doi.org/10.3390/s16122093, Dec. 9, 2016, retrieved from https://pdfs.semanticscholar.org/6dc 7 /75fb 79fc 7 ca85d795d8f520d79a03ea45311.pdf?ga=2.91420569.2075682402.1541162314-1823527149.1541162314 on Nov. 2, 2018.

Larin, Kirill V., et al., Noninvasive Blood Glucose Monitoring With Optical Coherence Tomography, Diabetes Care, vol. 25, No. 12, Dec. 2002, retrieved from the Internet on Oct. 2, 2018.

Chung et al., Simultaneous Measurements of Glucose, Glutamine, Ammonia, Lactate, and Glutamate in Aqueous Solutions by Near-Infrared Spectroscopy, DOI: 10.1366/0003702963906447, Applied Spectroscopy, Feb. 1996, retrieved from www.researchgate.com on Oct. 2, 2018.

R Fisher, S. Perkins, A. Waiker and E. Wolfart, Frequency Filter, Image Processing Learning Resources, J003, retrieved from the Internet on Jun. 24, 2014 at http://homepages.inf.ed.ac.uk/rbf/HIPR2/freqfilt.htm.

Bandodkar et al., Tattoo-Based Noninvasive Glucose Monitoring: A Proof--0f-Concept Study, dx.doi.org/10.1021/ac504300n, Anal. Chem. 2015, 87, 394-398, American Chemical Society, retrieved from the internet on Oct. 2, 2018 at https://pubs.acs.org/doi/pdf/10.1021/ac504300n.

Grose, Julianne H. et al., The Role of PAS Kinase in PASsing the Glucose Signal, Sensors 2010, 10, 5668-5682; doi:10.3390/s100605668, ISSN 1424-8220, www.mdpi.com/journal/sensors, Jun. 4, 2010, retrieved from the Internet on Oct. 2, 2018.

Fernandez, Clara Rodriguez, Needle-Free Diabetes Monitoring: An Interview with the Founder of GlucoWise, Nov. 28, 2016, Labiotech IG, retrieved from the Internet on Oct. 1, 2018.

Routh, Vanessa H, Glucose Sensing Neurons in the Ventromedial Hypothalamus, Sensors 2010, 10, 9002-9025; doi:10.3390/s101009002, ISSN 1424-8220, www.mdpi.com/joumal/sensors, Aug. 10, 2010, retrieved from he Internet on Oct. 2, 2018 at https://www.researchgate.net/publication/4 7369031 _Glucose_ Sensing_ Neurons inthe_ Ventromedial_ Hypothalamus/download, p. 9009.

Choi, Heungjae et al., Design and In Vitro Interference Test of Microwave Noninvasive Blood Glucose Monitoring Sensor, IEEE Trans Microw Theory Tech. Oct. 1, 2015; 63(10 PI 1): 3016-3025, doi: 10.1109/TMTT.2015.2472019, PMCID: PMC4641327, EMSID: EMS65843, PMID: 26568639, retrieved from the Internet on Oct. 2, 2018.

Yilmaz, Tuba et al., Detecting Vital Signs with Wearable Wireless Sensors, Sensors 2010, 10, 10837-10862; doi:10.3390/s101210837, ISSN 1424-8220, Dec. 2, 2010, retrieved from www.mdpi.com/journal/sensors on Oct. 2, 2018.

Vashist, Sandeep Kumar, Non-Invasive Glucose Monitoring Technology in Diabetes Management: A Review, Analytica Chimica Acta 750 (2012) 16-27, NUS Nanosience and Nanotechnology Initiative (NUSNNI) NanoCore, National University of Singapore, T-Lab Level 11, 5A Engineering Drive 1, Singapore 117580, Singapore, Elsevier B. V., Apr. 2, 2012, retrieved from the Internet on Oct. 2, 2016.

Hao-Yu Wu et al., Eulerian Video Magnification for Revealing Subtle Changes in the World, ACM Transactions on Graphics (TOG)—SIGGRAPH 2012 Conference Proceedings, vol. 31 Issue 4, Jul. 2012, Article No. 65, ACM New 39 York, Ny, USA, ISSN: 0730-0301 EISSN: 1557-7368 doi 10.1145/2185520.2185561, published on Jul. 1, 2012, etrieved from the Internet on Jul. 9, 2014 from http://people.csail.mil.edu/billf/publications/Eulearian_Video_Magnification.pdf.

T:Duardo S.L. Gastal, Adaptive Manifolds for Real-Time High-Dimensional Filtering, ACM Transactions on Graphics (TOG)—SIGGRAPH 2012 Conference Proceedings, vol. 31 Issue 4, Jul. 2012, Article No. 33, ACM New York, NY, USA, ISSN: 0730-0301 EISSN: 1557-7368, doi10.1145/2185520.2185529, retrieved from the Internet on on Jul. 9, 2013 from http://inf.ufrgs.br/-eslgastal/AdaptiveManifolds/Gastal Oliveira SIGGRAPH2012 Adaotive Manifolds.pdf.

Sunghyun Cho, Video deblurring for hand-held cameras using patch-based synthesis, ACM Transactions on Graphics (TOG)—SIGGRAPH 2012 Conference Proceedings, vol. 31 Issue 4, Jul. 2012, Article No. 64, ACM New York, NY, USA, ISSN: 0730-0301 EISSN: 1557-7368 doi 10.1145/2185520.2185561, published on Jul. 1, 2012, retrieved from the Internet on Jul. 9, 2014 from http://juew.org/publication/video_deblur.pdf.

C. Liu, Motion magnification, ACM SIGGRAPH 2005, pp. 519-526, 2005, retrieved from http://people.csail.mil.edu/celiu/pdfs/motionmag.pdf on Jul. 9, 2014.

O. Ari Kan, Interactive Motion Generation from Examples, ACM Transactions on Graphics (TOG), Proceedings of ACM SIGGRAPH 2002, vol. 21 Issue 3, Jul. 2002, pp. 483-490, ACM New York, NY, USA, SBN:1-58113-521-1, doi 10.1145/566654.566606, retrieved from the Internet on Jul. 9, 2014 from http://www.okanarikan.com/Papers/SynthesisFromExamples/paper.pdf.

John L. Smith, The Pursuit of Noninvasive Glucose: "Hunting the Deceitful Turkey", Fourth Edition, 2015, retrieved from the Internet on Oct. 1, 2018 from http://www.mendosa.com/The%20Pursuit%20of'/o20Noninvsive%20Glucose,%20Fourth%20Edition.pdf.

Zheng, Ya-Li et al., Unobtrusive Sensing and Wearable Devices for Health Informatics, IEEE Transactions on Biomedical Engineering, Mar. 2014, DOI: 10.1109/TBME.2014.2309951, retrieved from the Internet on Oct. 1, 2018 from https://www.researchgate.net/publication/260419901.

Yitzhak Mendelson, Pulse Oximetry: Theory and Applications for Noninvasive Monitoring, CUN.CHEM. 38/9, 1601-1607, (1992), retrieved from the Internet on Oct. 2, 2018.

Stephen F. Mallin et al., Noninvasive Prediction of Glucose by Near-Infrared Diffuse Reflectance Spectroscopy, Clinical Chemistry 45:9, 1651-1658 (1999), Oak Ridge Conference, retrieved from the Internet on Oct. 2, 2018 from http://clinchem.aaccjnls.org/contenl/clinchem/45/9/1651.full.pdf.

Thennadil et al., Comparison of Glucose Concentration in Interstitial Fluid, and Capillary and Venous Blood During Rapid Changes in Blood Glucose Levels, Diabetes Technology & Therapeutics, vol. 3, No. 3, 2001, Mary Ann iebert, Inc., retrieved from the Internet on Oct. 2, 2018 from http://thenemiirblog.ubiquilighl.com/pdf/GlucoseInterstitialvCapillaryvVenous.pdf.

(56) References Cited

OTHER PUBLICATIONS

Khalil et al., Non-Invasive Glucose Measurement Technologies: An Update from 1999 to the Dawn of the New Millennium, Diabetes Technology & Therapeutics, vol. 6, No. 5, 2004, Mary Ann Liebert, Inc., retrieved from the Internet on Oct. 2, 2018 from http://bme240.eng.uci.edu/students/06s/eclin/articles/long.pdf.

Caduff et al., First human experiments with a novel non-invasive, non--optical continuous glucose monitoring system, Biosensors and Bioelectronics xxx (2003) 1-9, retrieved from the Internet on Oct. 2, 2018.

\* cited by examiner

APPARATUS AND METHODS FOR MEASURING BLOOD PRESSURE AND OTHER VITAL SIGNS VIA A FINGER

CROSS REFERENCE TO RELATED APPLICATIONS

This application is a national phase application of International Application S.N. PCT/US23/24253, filed Jun. 2, 2023, entitled "Apparatus and Method for Improving Blood Pressure Measurements Via a Finger", which claims the benefit of U.S. Provisional Patent Application Ser. No. 63/365,818, filed Jun. 3, 2022, entitled "Apparatus and Method for Improving Blood Pressure Measurements Via a Finger" ("the Provisional Application"), each of which is incorporated herein by reference in its entirety as if the contents thereof had been stated herein.

Subject to the following clarifications and qualifications, the following U.S. Patents and U.S. Patent Publications (collectively "the References") are also incorporated herein by reference in their entireties as if the contents thereof had been stated herein. No subject matter of the References that is contrary to the instant disclosure is incorporated herein. No claims of the References are incorporated herein. In the event of inconsistencies between this disclosure and the References, the References should be considered supplementary hereto, and the instant disclosure controls in the event of any irreconcilable inconsistencies. Information in the References is incorporated herein only to the extent that no conflict exists between such information and this disclosure. In the event of a conflict that would render any claim hereof invalid, then such conflicting information is specifically not incorporated by reference herein. The foregoing disclaimers do not apply to the Provisional Application. The References are: U.S. Pat. Nos. 8,950,935; 10,492,684; 10,485,431; and 11,504,014; and, U.S. Published Patent Application No. 2018-0235478A1.

TECHNICAL FIELD

This disclosure relates generally to systems and methods for measuring blood pressure alone or in combination with one or more other non-blood pressure vital signs such as hematocrit, total protein, blood glucose levels, $SpO_2$, pulse rate, respiratory rate, temperature, EEG, and others, in a mammal, such as a human, via a finger. More particularly, this disclosure relates to an improved method and apparatus for accurately measuring blood pressure alone via the finger, or in combination with other vital signs.

BACKGROUND

As used herein, the terms monitor/monitoring, measure/measuring, capture/capturing, detect/detecting, and sense/sensing are used synonymously, unless the context in which they are used suggests otherwise. Likewise, the terms user, person and subject, pulse rate and heart rate, pulse oximetry and $SpO_2$, pump and pneumatic engine, and physiological characteristics and vital signs are used synonymously, unless the context in which they are used suggests otherwise. Accordingly, and subject to the foregoing exception, such terms may be considered to have been used interchangeably throughout.

The above referenced, commonly assigned, U.S. Pat. No. 11,504,014 ("the 014 patent") discloses an apparatus and method for measuring blood pressure and other vital signs via a finger. The blood pressure measurement system disclosed in the 014 patent employs a circular inflatable measurement bladder that is adapted to receive, and when inflated, substantially fully envelope and substantially fully compress and contact substantially the entirety of the periphery of the portion of the finger, and negates any need for the use of light, light sensors, optical measurements, or the use of any other type of electromagnetic radiation (or measurement thereof) to provide an indication of blood pressure. However, it has been found that the accuracy of blood pressure measurements taken via a finger may be improved without the use of an inflatable measurement bladder that fully surrounds or fully contacts and fully compresses the entirety of the periphery of the finger. In particular, it is had been found that blood pressure measurements are unexpectedly and dramatically improved when the inflatable measurement bladder is configured to contact only a bottom portion of the finger, and a force or pressure is applied to the top of finger so as to urge the finger toward the inflatable measurement bladder while a blood pressure measurement is being taken.

BRIEF DESCRIPTION OF THE DISCLOSURE

There is disclosed a vital sign measuring device (VSMD) that measures blood pressure via a finger. The VSMD comprises an arcuate inflatable measurement bladder adapted to only partially contact a surface of the finger, and particularly at least the surface of the finger pad on the underside of the finger but not the entirety of the surface of the finger. The bladder may be disposed on an arcuate cradle coupled to a base that houses an inflation pump, a relief valve, a pressure sensor, a microprocessor, and circuitry for controlling the pump and valve and processing signals from the pressure sensor. During a blood pressure measurement cycle, the bladder does not fully envelope the finger, or fully compress or fully contact the entirety of the periphery of the finger. Rather, the bladder contacts only a portion of the underside of the finger.

The term "structure or other implement" (SOI), and like terms used herein, mean structure that is associated or integral with the overall measurement apparatus described herein for applying a force or pressure to the top of the finger, or other structure of implement separate and/or distinct from the overall measurement apparatus, that applies such force or pressure. As disclosed herein, SOI's are employed to urge the finger pad against a corresponding portion of a bladder. The SOI enhances contact between the digital arteries in the finger pad and a corresponding portion of the bladder and reduces or eliminates movement of the finger relative to the bladder during a measurement cycle. The 014 patent describes how an oscillometric signal provided by a pressure sensor that reads bladder pressure is analyzed to provide an indication of blood pressure. The instant disclosure employs the same oscillometric signal to calculate an indication of blood pressure. The same blood pressure measurement algorithms disclosed in the 014 patent may be employed in connection with the instant disclosure. The use of an SOI has been found to significantly increase the amplitude of the oscillometric signal measured by the pressure sensor and to reduce noise and other artifacts that might otherwise be present therein, thus resulting in significantly improved signal to noise ratio and more accurate and repeatable systolic and diastolic blood pressure measurement.

The VSMD may also measure pulse rate via the oscillometric signal. There is no need for the use of light, light sensors, optical measurements, or the use of any other type of electromagnetic radiation (or measurement thereof) to provide an indication of blood pressure or pulse rate.

There is also disclosed VSMD embodiments that, in addition to measuring blood pressure via the finger pad, comprise a physiological light monitoring system (PLMS) for additionally measuring one or more of the following non-blood pressure vital signs: blood glucose levels, heart rate variability, respiration rate, $SpO_2$, blood flow, total hemoglobin (SpHb), PVi, methemoglobin (SpMet), acoustic respiration rate (RRa), carboxyhemoglobin (SpCO), oxygen reserve index (ORi), oxygen content (SpOC), hematocrit (Hc), total protein (TP), EEG and temperature. Details of the PLMS may be found in the 014 patent.

A display may provide visual indications of vital signs. Data may be communicated to a smartphone equipped with an app for generating and displaying health scores and for communicating vital sign data to a remote patient monitoring system.

BRIEF DESCRIPTION OF THE DRAWINGS

The description of the drawings below refers to various embodiments of apparatuses, systems and methods for implementing a VSMD that employs an SOI for measuring blood pressure via a finger pad, and optionally a PLMS for measuring vital signs other than blood pressure and is not intended to limit the scope of the disclosure and/or the inventions described therein, except as set forth in the appended claims.

DETAILED DESCRIPTION

Figure 1:
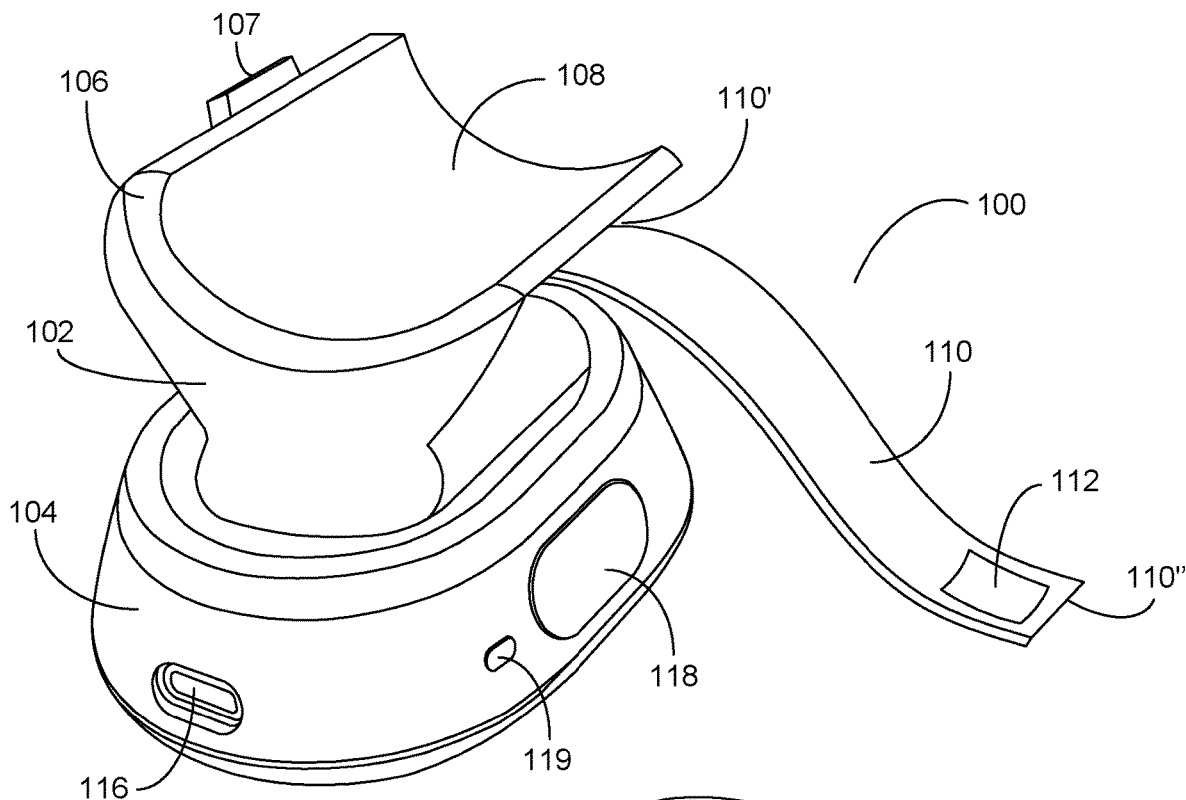
FIG. 1 is a perspective view of a VSMD for measuring blood pressure and pulse rate via a finger pad. The embodiment of FIG. 1 employs an arcuate cradle having an inflatable bladder and a strap for implementing the SOI.
Figure 3:
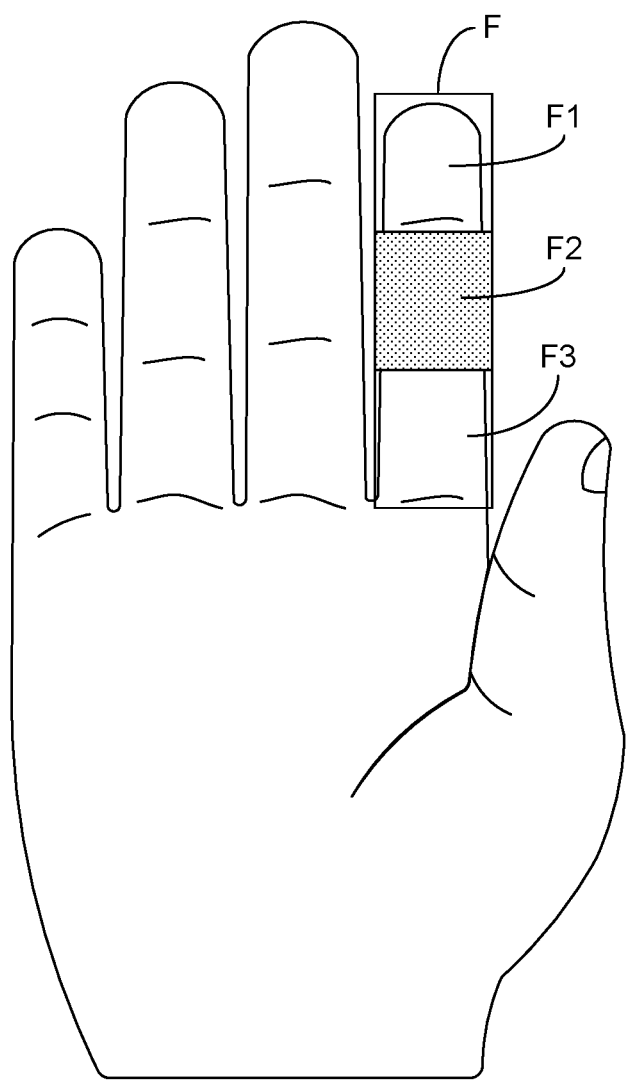
FIG. 3 illustrates three different regions of the bottom of a finger, i.e., finger pads, from which blood pressure and pulse rate can be measured according to the instant disclosure.

Referring to the drawings, wherein like numerals represent like elements, there is shown in FIG. 1 an embodiment of a VSMD 100 for measuring blood pressure and pulse rate. The VSMD 100 comprises a cradle 102 affixed to a base 104. The cradle 102 comprises a rigid arcuate portion 106 (which in the embodiment of FIG. 1 forms less than a full circle) to which a conforming, correspondingly arcuate inflatable bladder 108 is affixed. The cradle is adapted to receive the bottom portion of a finger defining a finger pad F1, F2 or F3 (see FIG. 3) such that the finger pad rests on the outer surface of the inflation bladder. A strap 110 defines the SOI. A proximal end 110' of the strap is affixed to the cradle and a distal end 110" is loose. The strap, or a portion thereof, may comprise a hook and latch fastener 112, such as Velcro®.

Figure 2:
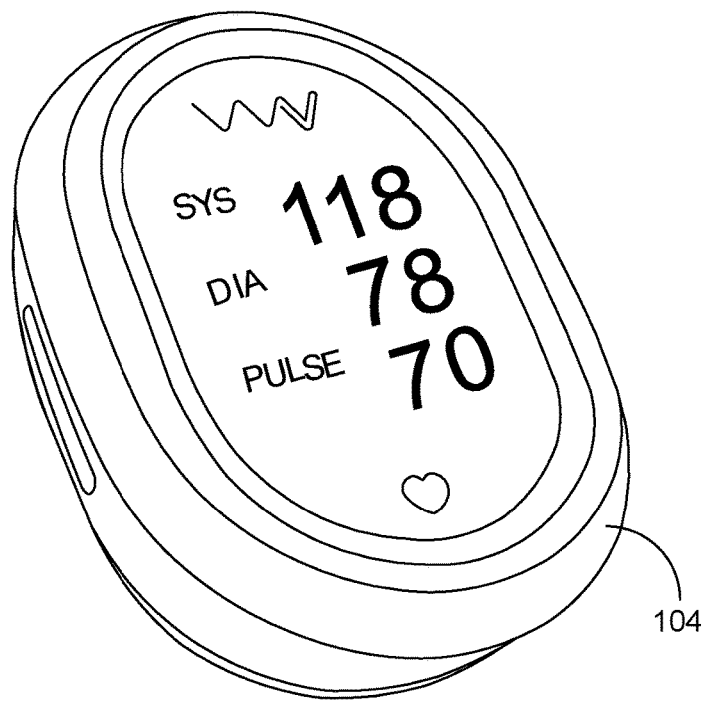
FIG. 2 is a bottom view of the VSMD of FIG. 1 and illustrates a display thereof.
Figure 4:
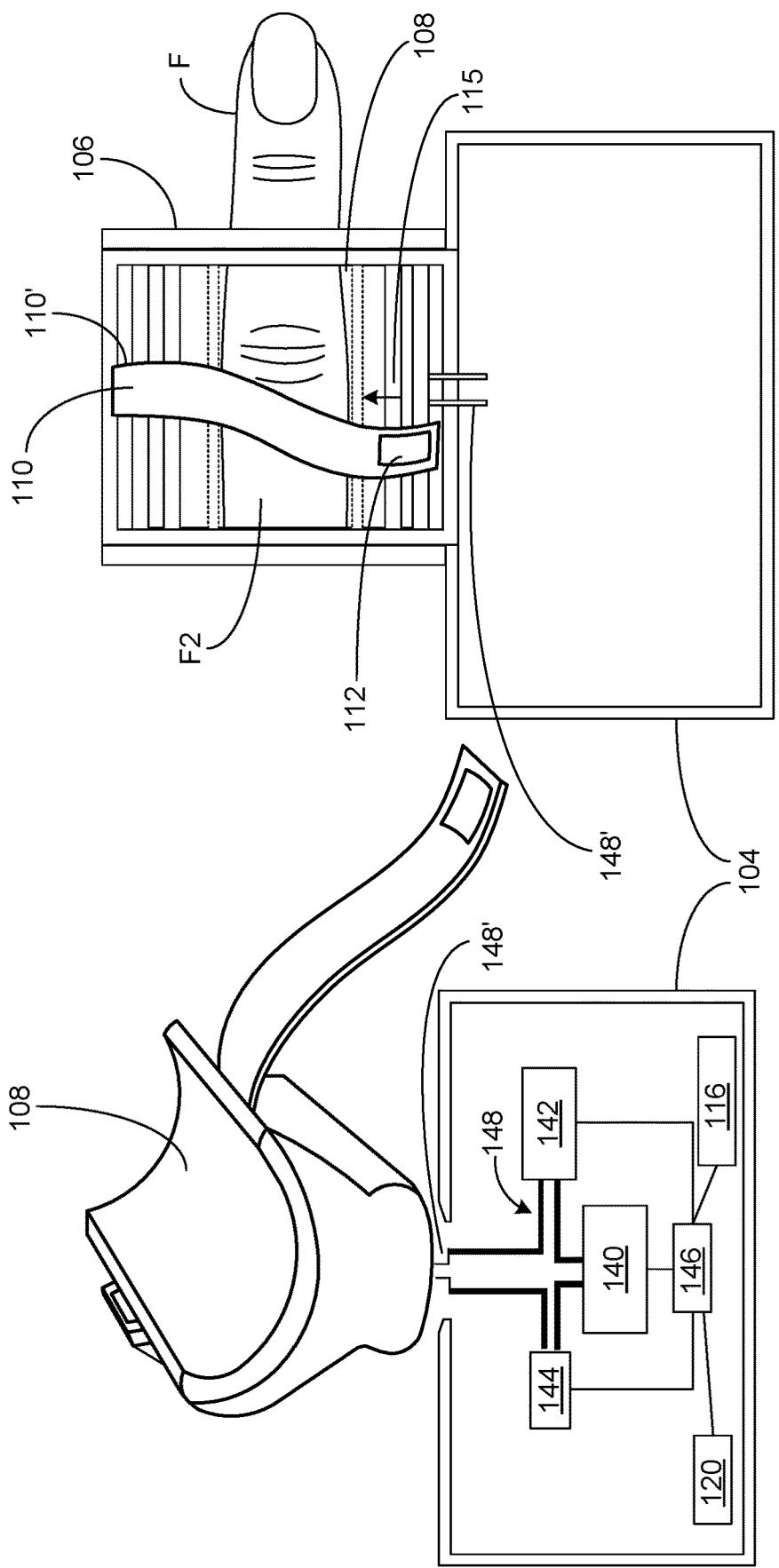
FIG. 4A illustrates the VSMD of FIG. 1 including a block diagram of the components that may be contained in the base thereof for calculating blood pressure and pulse rate.
FIG. 4B illustrates a finger resting in the cradle of the VSMD of FIGS. 1 and 4A and shows an SOI applied across the top of the finger.

As shown in FIGS. 4A and 4B, a hose connection 148' in the base 104 allows for pneumatic communication with the bladder 108. The base 104 also houses an inflation pump 144 for controllably inflating the bladder via the air hose 148, a pressure sensor 140 for providing indications of bladder pressure applied to the finger pad, and a relief valve 142 for controllably deflating the bladder via the air hose 148. The base also houses a temperature sensor 120 (such as an infrared sensor, thermopile, or thermocouple) for measuring body temperature at the finger, and circuitry, including a microprocessor 146. The microprocessor is operatively coupled to/interfaced with the pump, the pressure sensor, relief valve and temperature sensor (and other sensors, switches and control devices disclosed herein) for receiving pressure sensor and temperature data, controllably operating the pump and relief valve, and calculating blood pressure and body temperature measurements, and, if desired pulse rate, using the algorithms described below, and more fully in the 014 patent. A USB communications port and/or wireless communications circuitry (e.g., Bluetooth) 116 may be provided for facilitating firmware updates and/or for off-loading data from the VSMD to another device, e.g., a smartphone, and/or an apparatus such as a remote patient monitoring system (RPMS). A power button 118 may be provided for powering the device up/down and/or for commencing a blood pressure measuring cycle. An LED 119 may indicate the power status (on/off) of the VSMD. A proximity sensor (not shown) may be employed to detect the presence of a finger on the bladder so as prevent inflation of the bladder unless a finger has been disposed thereon. The cradle 102 and base 104 may be comprised of molded thermoplastic materials. The bladder 108 may be constructed from an elastic air-tight material, such as silicon, nylon, latex, rubber, etc. Measurement may be performed at any of the finger pad portions F1, F2, F3 of a finger F illustrated in FIG. 3. As shown in FIG. 2, a display may be provided on the underside of the base 104 of VSMD 100 for displaying systolic blood pressure, diastolic blood pressure, pulse rate and any other desired characteristics that are being measured.

FIG. 4B illustrates a finger pad portion F2 of finger F in the cradle 106 and resting on the top (outwardly facing portion) of the bladder 108. As shown, the strap 110 has been placed over the corresponding portion of the top of the finger F and the fastening portion 112 at the distal end 110" thereof has been affixed to a mating portion (not shown) disposed on the side of the cradle opposing the side to which the proximal end 110' of the strap has been affixed. Alternatively, the cradle may comprise a slotted structure 107 on the side opposing the affixed strap portion 110'. In such case, the strap 110 may be placed over the finger F, through the slot in structure 107 and looped back over the finger and attached to itself in well-known fashion. The strap should be slightly tightened over the finger only insomuch as is required to prevent movement of the finger relative to the bladder and to secure the finger in the cradle. It will be appreciated that, as shown by arrow 115, inflation of the bladder 108 will apply pressure only to a portion of the underside of the finger, e.g., to the finger pad F2, since the finger has been restrained relative to the bladder by the strap 110, thereby allowing blood pressure measurement via the finger pad.

As a consequence of the combined structures of the cradle 102, the bladder 108 and strap 110, and the circuitry and algorithms described herein and in the 014 patent, there is no need to employ electromagnetic radiation (EMR) based measurement techniques, including laser based or other optical based measuring techniques (such as mDLS) that employ measurement of EMR reflection and/or transmission to measure blood pressure. Together with such structure, and the use of the oscillometric method described herein to analyze pressure data in the bladder, blood pressure may be measured with substantially greater accuracy than with the embodiments disclosed in the 014 patent, or any other known prior art systems for measuring blood pressure via a finger. Supplemental EMR based measurements that purport to improve the accuracy of blood pressure and pulse rate measurements are not needed.

As shown in FIG. 1, the cradle may be affixed to or integral with the base. However, the cradle may be separate from the base and coupled thereto via the air hose 148' and any other electrical connection that may be required to measure other characteristics, such as temperature or those measured by the PLMS. Alternatively, a cradle may not be employed at all, and the bladder may be affixed to the finger via a strap such as strap 110 so that the bladder contacts the finger pad. The strap may tightened only so much as is needed to prevent the bladder from moving relative to the finger.

Figure 5:
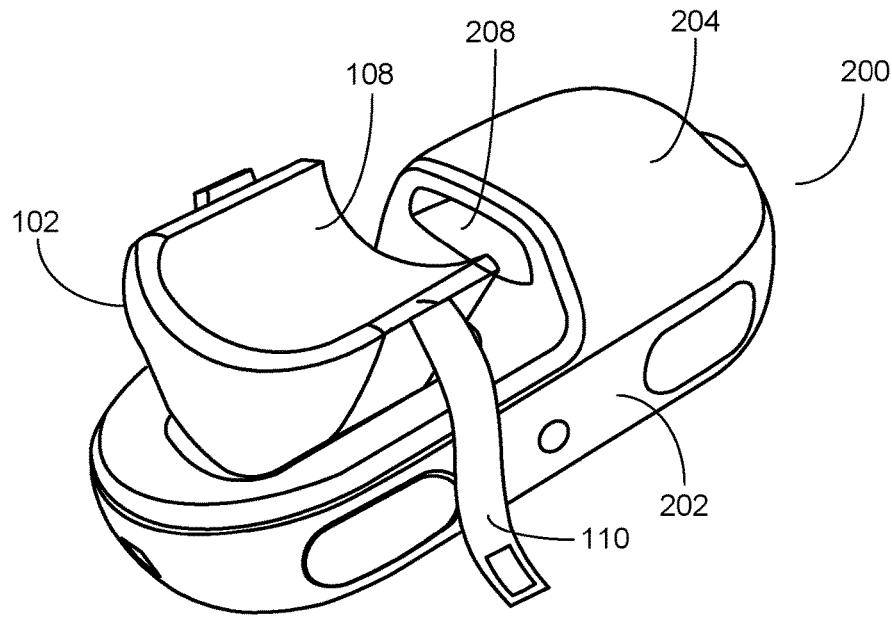
FIG. 5 illustrates the VSMD of FIG. 1 with an optional PLMS.
Figure 6:
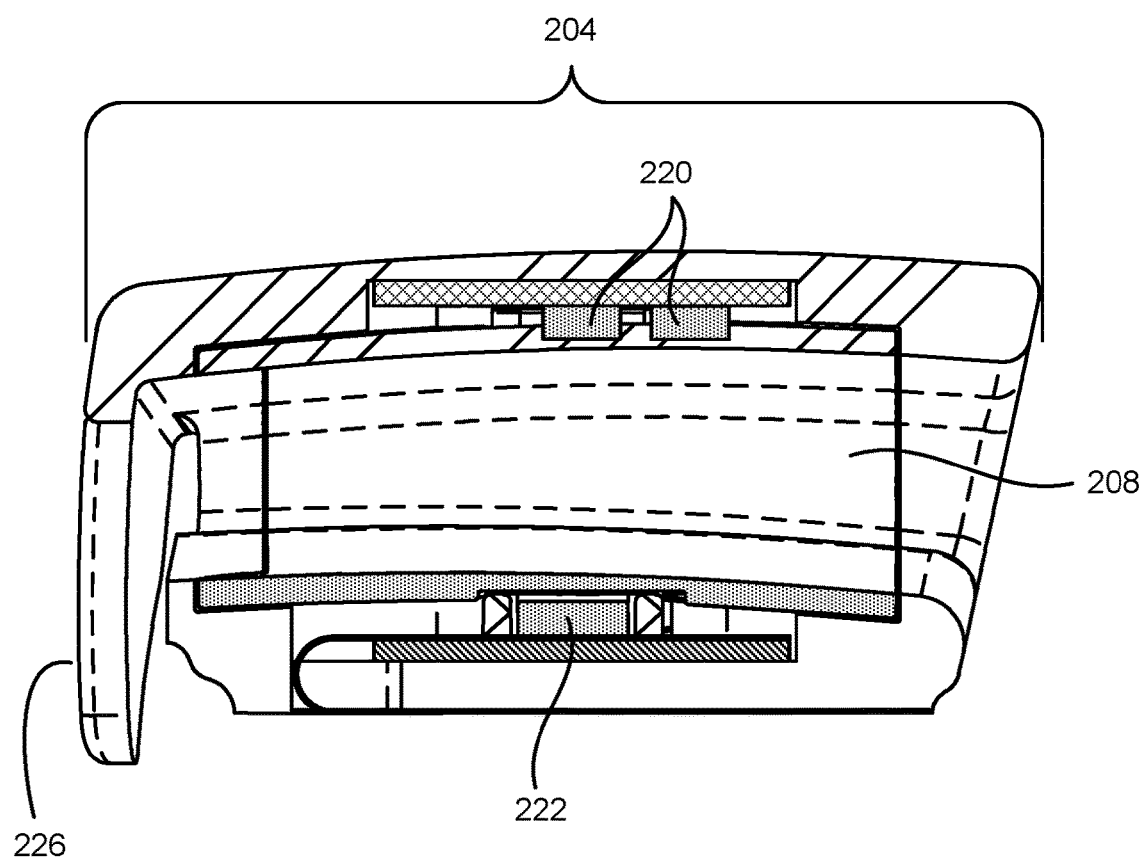
FIG. 6 illustrates the placement of light emitters and detectors used by the PLMS of FIG. 5.
Figure 7:
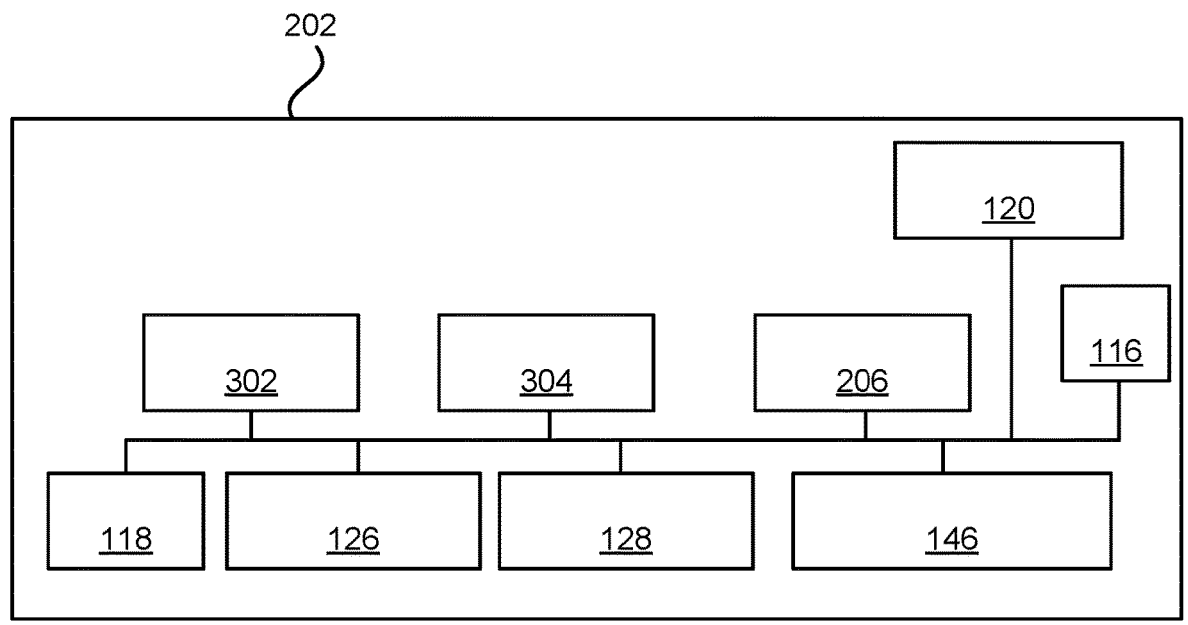
FIG. 7 is a block diagram of various sensors, switches, and circuitry that may be employed in the PLMS.

FIGS. 5, 6 and 7 illustrate a VSMD 200 that employs both the blood pressure measuring system described above, and a PLMS 204, both attached to a base 202. The PLMS may calculate vital signs and physiological characteristics such as blood glucose levels, respiration rate, saturation of peripheral oxygen (SpO$_2$), blood flow, total hemoglobin (SpHb), pleth variability index (PVi), methemoglobin (SpMet), acoustic respiration rate (RRa), carboxyhemoglobin (SpCO), oxygen reserve index (ORi), oxygen content (SpOC), EEG, hematocrit (Hc) and total protein (TP), as described in the 014 patent. If desired, the PLMS may also be used to calculate heart rate. The base may include a display for displaying one or more of the vital signs/physiological characteristics. Measurements are carried out after inserting one's finger F into the cavity 208 of the PLMS until the fingertip reaches a fingertip stop 226 (FIG. 6). The References provide greater details as to how such structures may be implemented and such measurements may be carried out.

As shown in FIG. 6, disposed within the PLMS are emitters 220 and emitter/detector 222 that emit/detect light as described below for obtaining data from which indications of these vital signs and physiological characteristics can be calculated. Emitters 220 and emitter/detector 222 are employed for transmissive light measurements (i.e., for measuring light emitted from emitters 220 and detected by emitter/detector 222 after being transmitted through a fingertip), whereas only emitter/detector 222 is employed for reflective light measurement (i.e., for emitting light, and measuring the light reflected from a fingertip).

Emitters 220 preferably emit light in two ranges:
  a. Configuration A: 640 nm-680 nm (and preferably at about 660 nm); and 920 nm to 960 nm (and preferably at about 940 nm).
  b. Configuration B: Continuous emitter from 200 nm to 1200 nm.
  c. Configuration C: 12 discrete emitters at specific frequencies in the range of 200 nm to 1200 nm.

Emitter/detector 222 preferably emits light in three ranges:
  a. Configuration A: 300 nm-415 nm (and preferably at about 395 nm); 640 nm-680 nm (and preferably at about 660 nm); and 920 nm-960 nm (and preferably at about 940 nm).
  b. Configuration B: Continuous emitter from 200 nm to 1200 nm
  c. Configuration C: 12 discrete emitters at specific frequencies in the range of 200 nm to 1200 nm.

Emitter/detector 222 preferably detects light in the range of 200-1200 nm.

Preferably, the photodiodes are physically arranged such that the emitters 220 are just above the fingernail and emitter/detectors 222 are just below the part of the bottom of the finger (the pad of the finger) under the fingernail. Further details are described in the 014 patent and the other References. The scope of the invention and the relevant appended claims are not limited to the foregoing emitter and emitter/detector configurations. Other configurations that emit and detect light within the disclosed ranges (or within reasonable proximity of the disclosed ranges) are contemplated to be within the scope of the claims, except as expressly noted therein.

As shown in FIG. 7, the base 202 of VSMD 200 may house a temperature sensor 120 for measuring body temperature at the finger, EKG pads 302, 304 for measuring EKG via one's fingertips, a camera module 126 for obtaining images of a portion of the skin of one's head when the VSM 200 is held adjacent the face, and a three-axis accelerometer 128 for detecting movement of the VSMD. The accelerometer may be used to terminate a respiratory rate measurement (or other measurement) upon detecting movement. The accelerator may also be employed for fitness tracking, e.g., measuring steps walked. A power switch 118 and a USB port 116 may also be provided. The display 206 may be integrated into the base. The 014 patent contains further details relating to the construction of and methods employed by the PLMS.

FIGS. 8-13 illustrate various alternative embodiments for implementing an SOI that may be employed in place of the SOI implementation of FIG. 1.

Figure 8A:
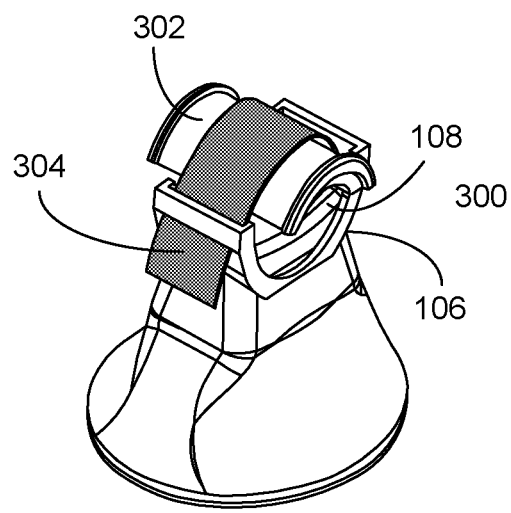
FIGS. 8A and 8B illustrate a VSMD for measuring blood pressure that employs another embodiment for implementing an SOI.
Figure 8B:
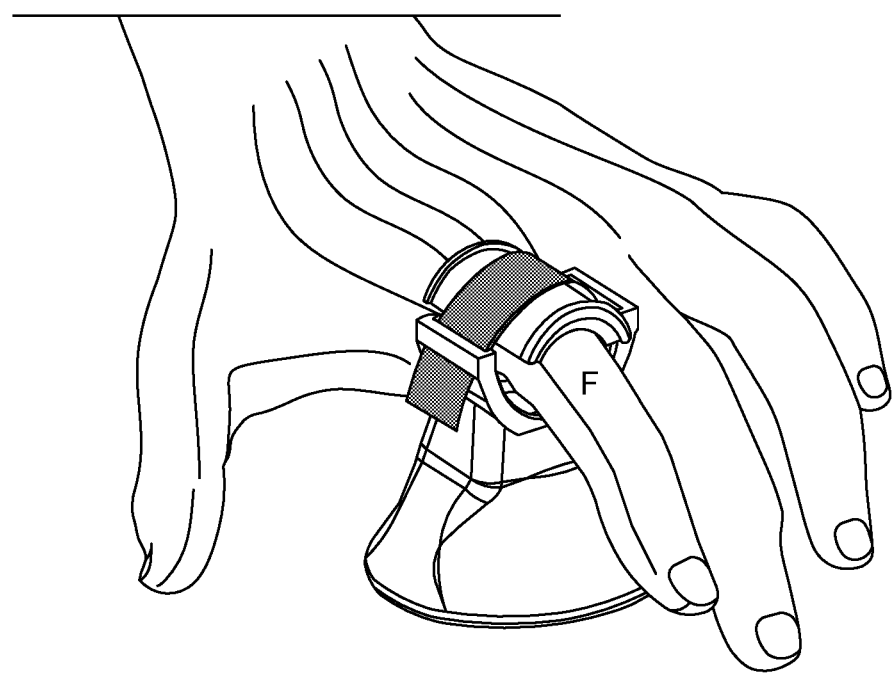

The VSMD 300 of FIG. 8A employs an SOI implementation that comprises an arcuate cap or insert 302 with a strap 304 disposed thereover. The cap 302 may be constructed of foam or thermoplastic. Strap 304 may be a hook and latch fastening strap. Finger F may be placed through the aperture defined by the combination of the cradle 106 and the cap 302, so that a finger pad thereof rests on the bladder surface 108, as shown in FIG. 8B. The strap 304 may be tightened and fastened in the same manner as the strap 110 in the embedment of FIG. 1. A variety of caps 302 having differing radii may be provided to accommodate varying finger sizes.

Figure 9A:
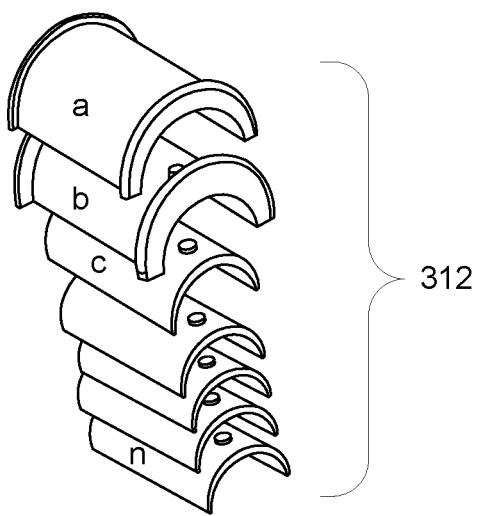
FIGS. 9A, 9B and 9C illustrate a VSMD for measuring blood pressure that employs yet another embodiment for implementing an SOI.
Figure 9B:
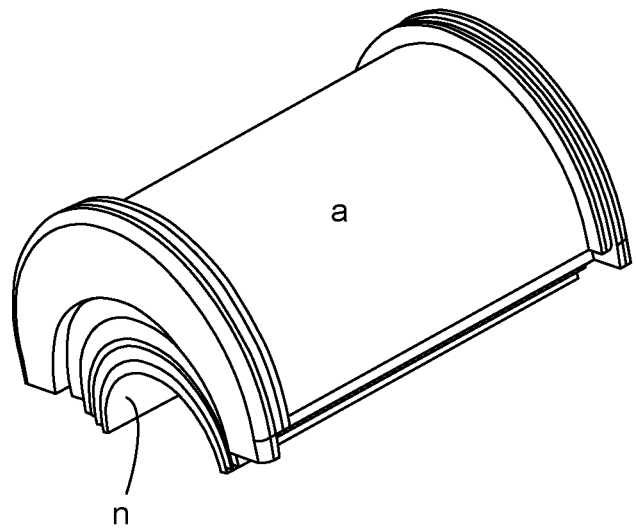
Figure 9C:
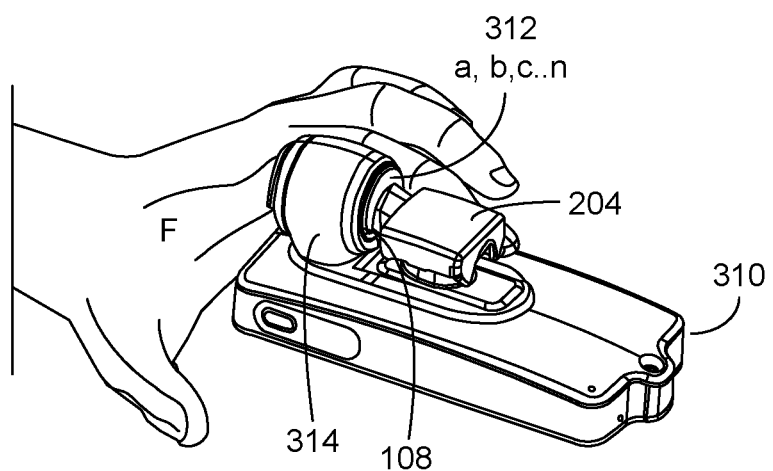

The VSMD 310 of FIGS. 9A-9C employs an SOI implementation that comprises a variety of stackable shims 312a-312n, with each shim a-n having a radius that complements the radius of each preceding and succeeding shims in the stack 312. FIG. 9C illustrates the inclusion of a PLMS 204 in the VSMD 310 for exemplary purposed only. In addition, the VSMD of FIG. 9C illustrates a substantially 360°, i.e., substantially fully circular, cradle 314 having a cavity through which the finger F may be placed. Finger F may also be extended into the PLMS 204 for vital sign measurements in addition to blood pressure. Bladder 108 is disposed at the bottom arcuate portion of the cradle, as in FIG. 1. One or more of the shims a-n may be placed on top of the finger and the finger may be then inserted into the cavity with the shims thereupon such that the shims apply the downward pressure or force previously described. Alternatively, the finger may be inserted into the cavity first, and then one of more of shims a-n may be slid on top of the finger and into the cavity so that they apply the aforementioned downward pressure or force. Variations of both techniques may also be employed.

Figure 10A:
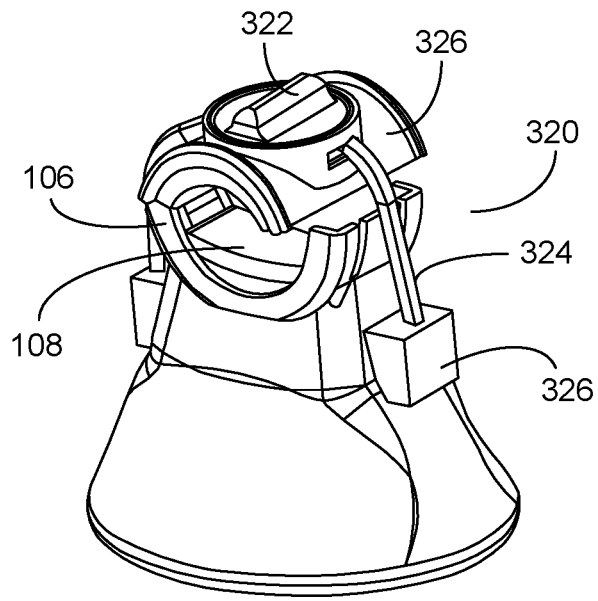
FIGS. 10A and 10B illustrate a VSMD for measuring blood pressure that employs still another embodiment for implementing an SOI.
Figure 10B:
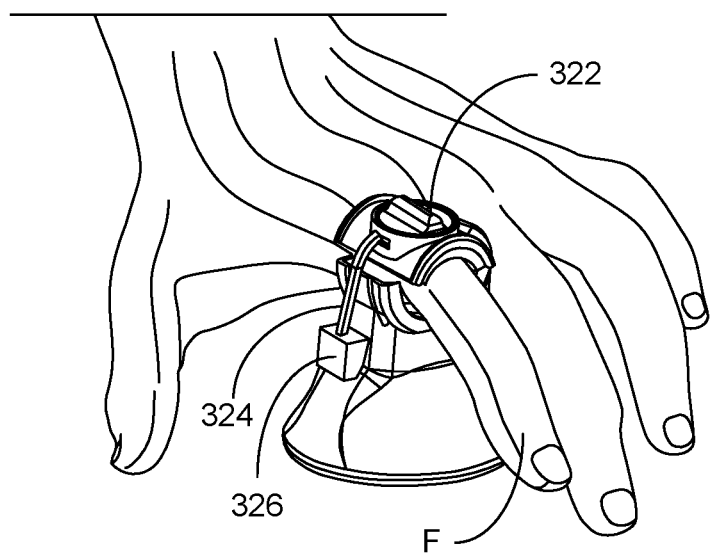

The VSMD 320 of FIGS. 10A, 10B employs an SOI implementation that comprises a cap/shim 326 to apply the downward pressure/force via a strap 324 affixed to a portion 326 of the VSMD. A twistable/rotatable knob 322 may be employed to adjust the amount of downward pressure/force to the top of Finger F.

Figure 11A:
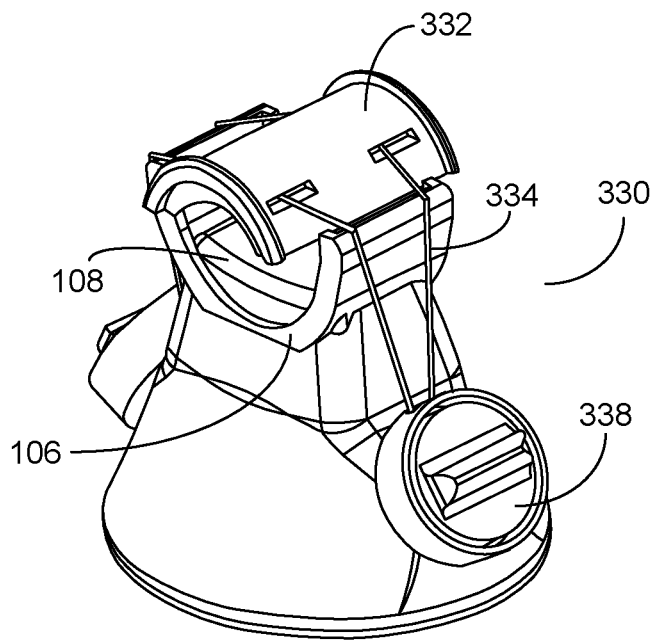
FIGS. 11A and 11B illustrate a VSMD for measuring blood pressure that employs still a further embodiment for implementing an SOI.
Figure 11B:
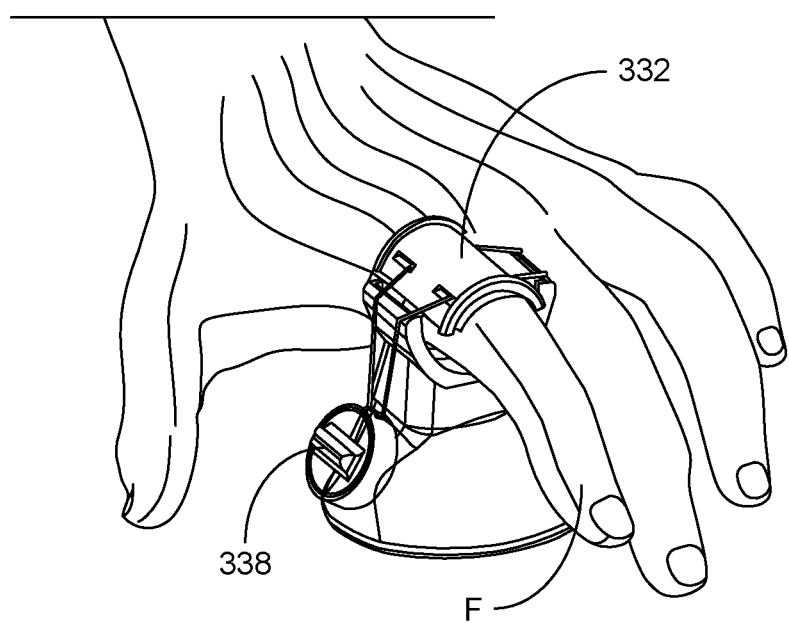

The VSMD 330 of FIGS. 11A, 11B employs an SOI implementation similar to that of FIGS. 10A, 10B. Dual straps 334 apply the downward force via a shim/cap 332 by rotation of the twistable/rotatable knob 338 disposed on the side of the base of the VSMD.

In each of the embodiments described above, it has been found that optimal results are achieved when the SOI is adjusted so as to limit lateral movement of the finger pad to a range of about 0.4 mm-4 mm relative to the surface of the inflatable bladder that contacts the finger pad.

Figure 12A:
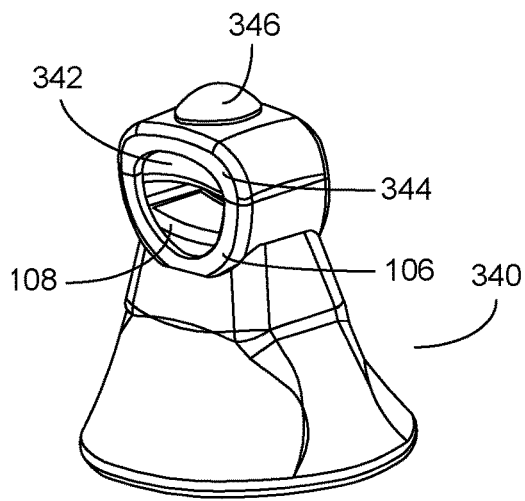
FIGS. 12A, 12B and 12C illustrate a VSMD for measuring blood pressure that employs still a further embodiment for implementing an SOI.

The VSMD 340 of FIGS. 12A-12 C employs an SOI implementation that comprises a second inflatable bladder 342 disposed at the top of a cuff formed by cradle 106 (on which the inflatable measurement bladder 108 is disposed) and an upper portion 344. When inflated, the second bladder 342 applies the downward pressure/force. A bolus pump 346 disposed on the upper portion 344 (or elsewhere) may be employed to inflate the second bladder 342 prior to commencing a blood pressure measurement cycle. In one implementation, after the finger F has been inserted into the cuff, the bolus pump is used to inflate the second bladder to about 10 mm Hg to about 50 mm Hg. This is a range that has been found to sufficiently retrain movement of the finger pad relative to the inflatable bladder. Thereafter, the inflatable bladder is inflated/deflated as herein described. A manual relief valve (not shown) may be employed to deflate the second bladder following the conclusion of a blood pressure measurement cycle.

Figure 13:
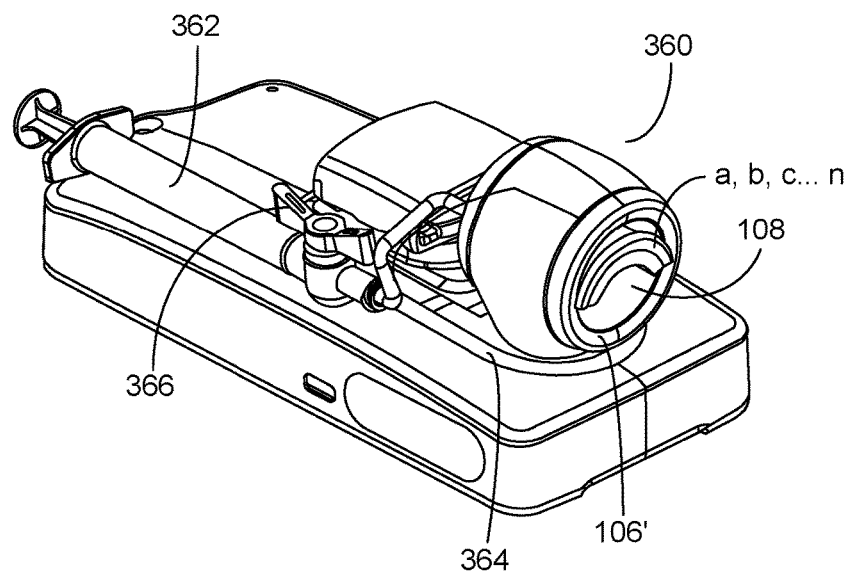
FIG. 13 illustrates a VSMD for measuring blood pressure that employs still a further embodiment for implementing an SOI.
Figure 12B:
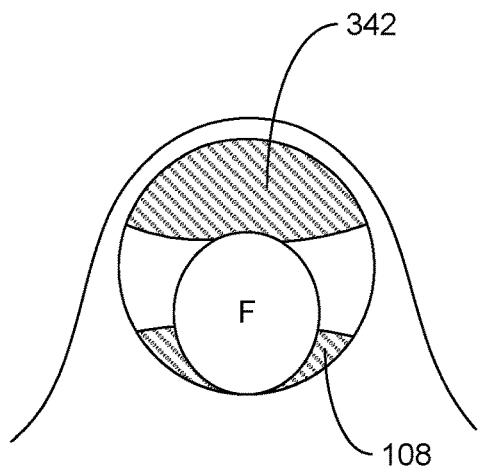
Figure 12C:
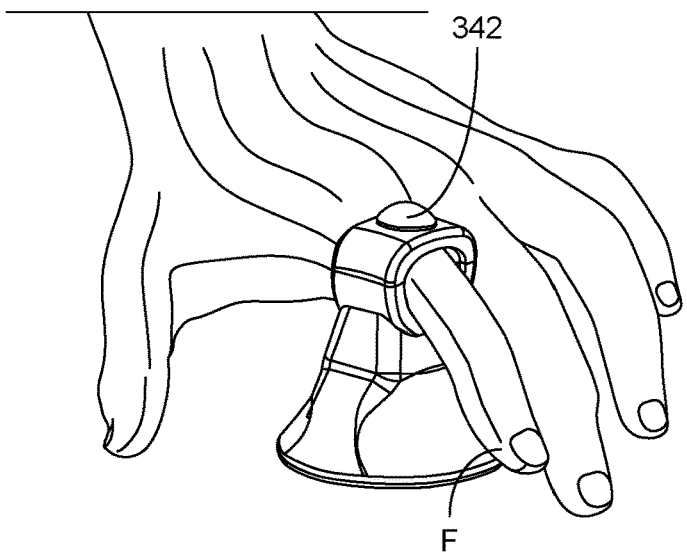

The SOI implementation for the VSMD 360 of FIG. 13 is similar in concept that of FIGS. 12A-12C in that a second inflatable bladder is employed to apply the downward force/pressure. A syringe 362 is pneumatically coupled to the second bladder via an air hose 364. A manual valve 366 may be employed to maintain pressure in the second bladder during a blood pressure measurement cycle and to deflate the second bladder following the conclusion thereof. As shown, if desired, shims a-n may also be employed as described, albeit in conjunction with inflation of the second bladder.

In yet another implementation, not illustrated, the downward force or pressure may be applied by pressing down on the portion of the top of finger F from which blood pressure measurement is to be taken by way of a finger on the user's other hand, such that lateral movement of the finger pad on finger F is limited to a range of about 0.4 mm-4 mm relative to the surface of the inflatable bladder that contacts the finger pad.

Figure 14:
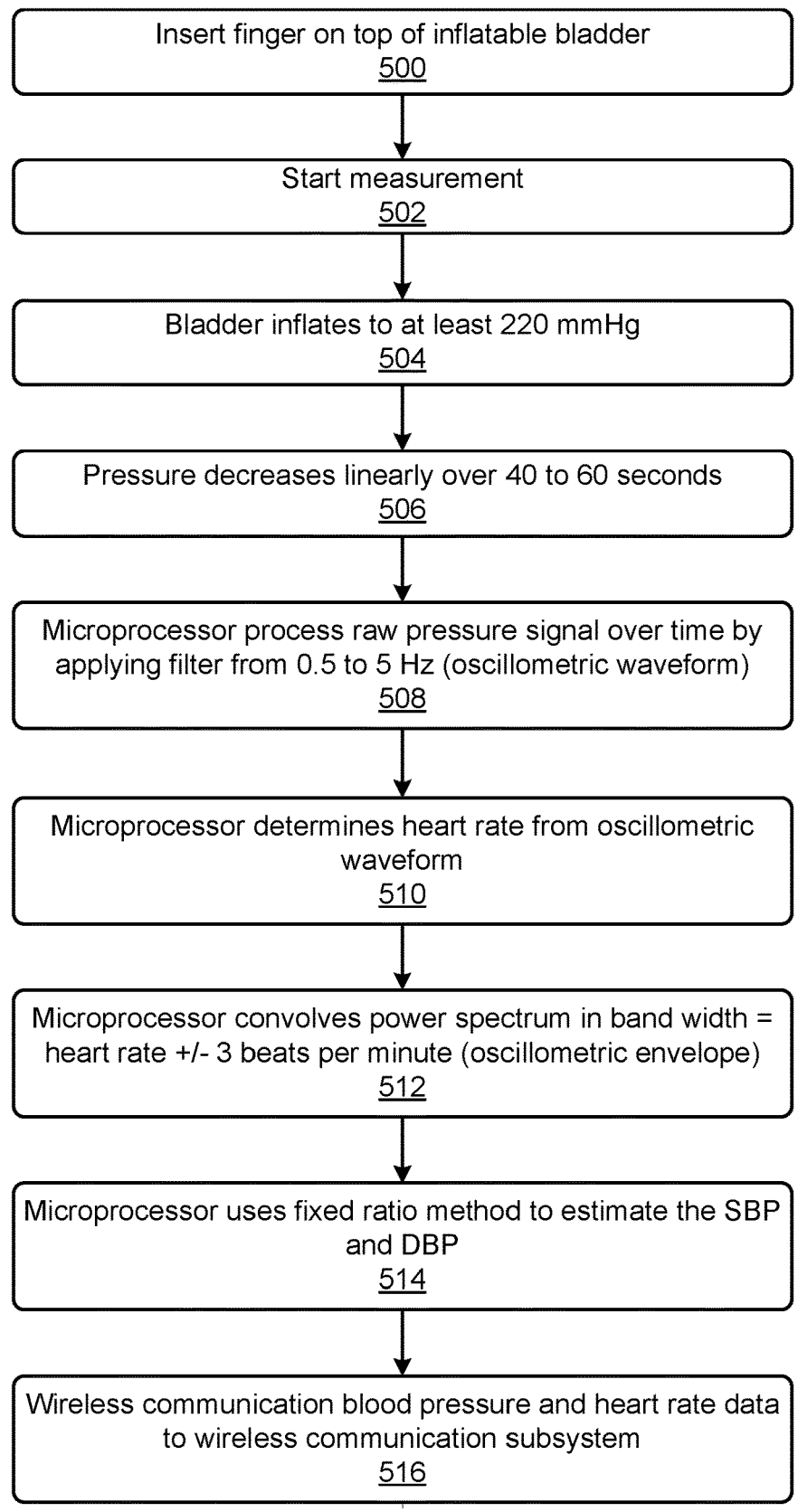
FIG. 14 illustrates a method of processing digital pressure sensor data to obtain blood pressure indications.
Figure 15A:
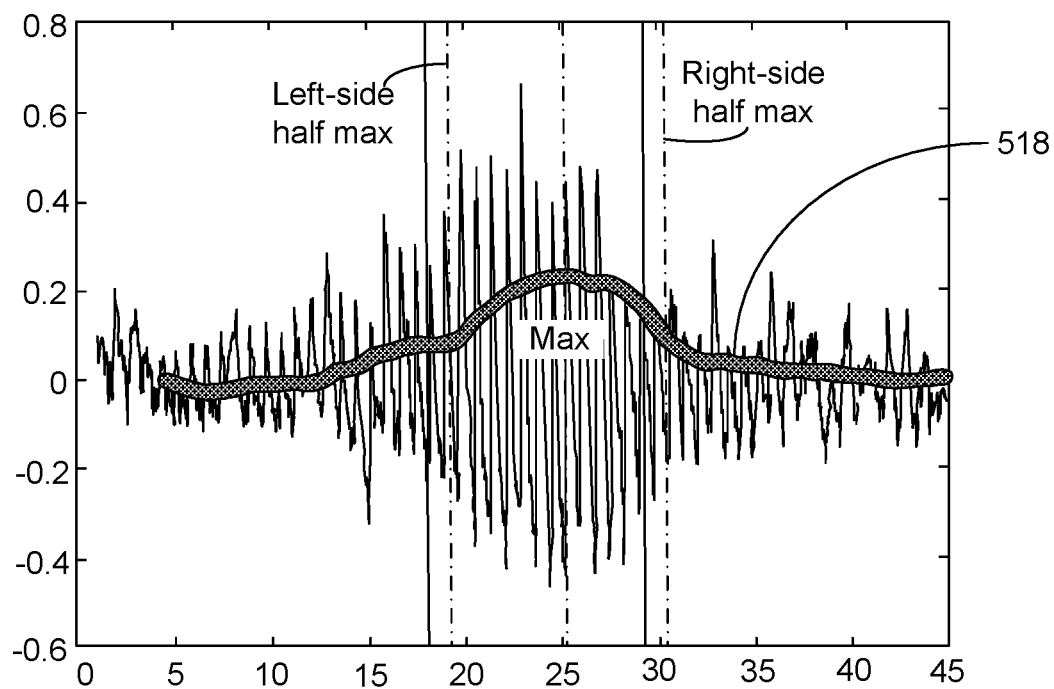
FIGS. 15A and 15B illustrate an oscillometric waveform and an oscillometric waveform envelope, respectively.

Referring to FIG. 14, there is shown a method of determining blood pressure, i.e., systolic blood pressure (SBP) and diastolic blood pressure (DBP) and pulse rate via the pressure sensor data. After a finger has been inserted onto the bladder 108 and the appropriate amount of downward pressure/force has been applied by the SOI, measurements may begin (502). Once a measurement cycle has begun, the pump inflates the bladder 108 to a target pressure, which is generally at least 220 mmHg (504). Once the bladder has reached its target pressure, the relief valve is controllably opened to allow the bladder pressure to decrease in a linear fashion over a period of 40-60 seconds (506). All of the foregoing steps are carried out under control of microprocessor 146 executing appropriate program code. As the bladder is deflated, the microprocessor processes raw pressure signal data over a period of time by applying a 0.5 Hz to 5 Hz filter thereto, to yield the oscillometric waveform (FIG. 15A). The oscillometric waveform data is analyzed by the microprocessor to provide an indication of heart rate (510). Heart rate data is then processed by the microprocessor to create a power spectrum 518 (FIG. 16A), and the microprocessor then convolves the power spectrum as noted at 512. The microprocessor then employs the fixed ratio method to provide an indication of SBP and DBP (514). Blood pressure and heart rate data is then communicated to a subsystem for storage and later use, either within the VSMS or remote from the VSMD, e.g., the RPMS (516). The SOI is thereafter released, removed, or deflated, so to allow removal of the finger.

Figure 15B:
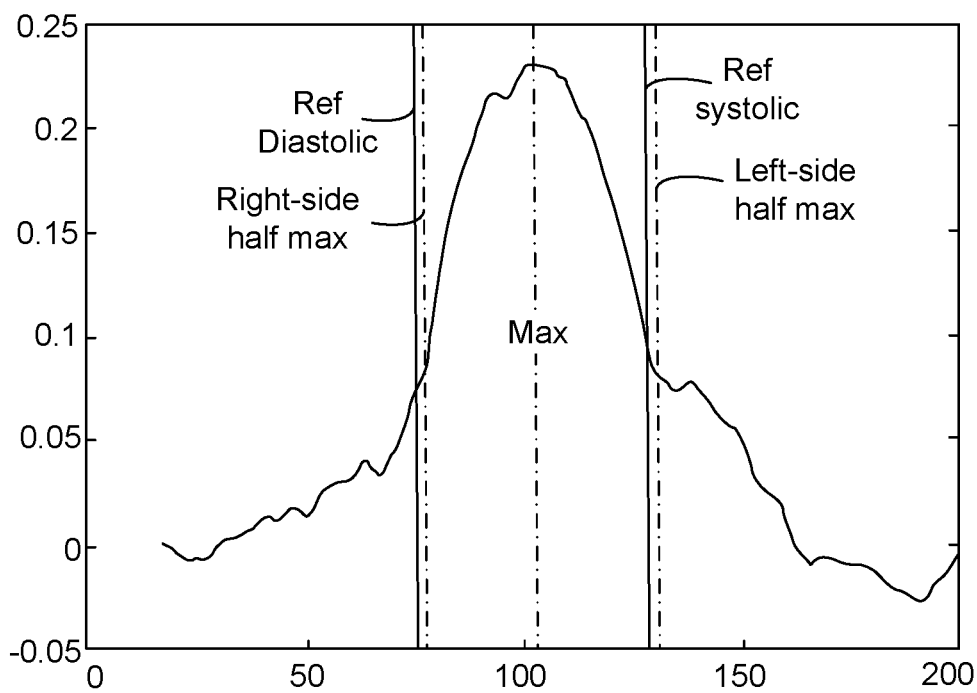

FIG. 15A is one example of an oscillometric waveform vs time (seconds). FIG. 15B is one example of an oscillometric waveform envelope vs. pressure (mmHg). The fixed-ratio method is employed to estimate systolic and diastolic blood pressure values from this data.

Figure 16A:
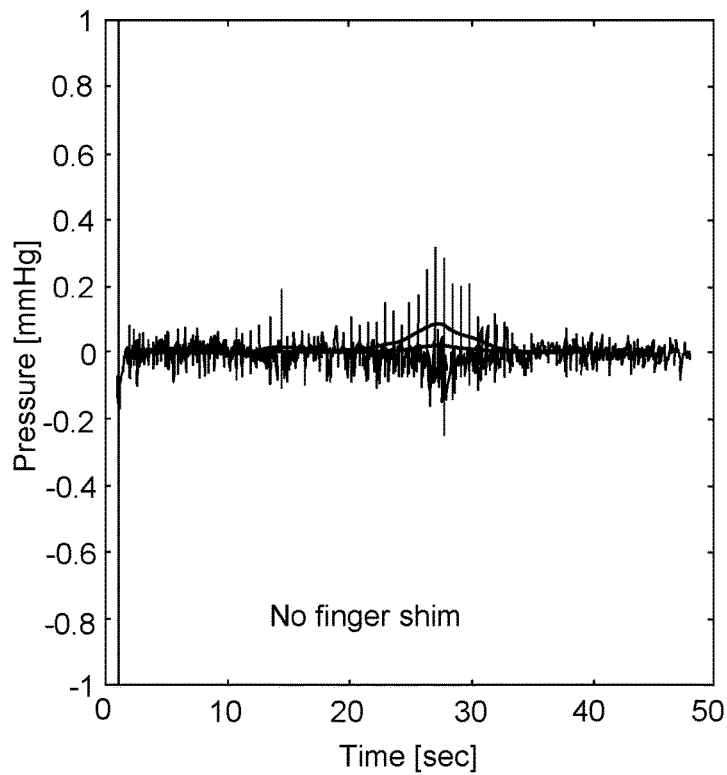
FIGS. 16A and 16B are graphs exemplifying the differences in amplitude of the oscillometric pressure waveform signal with and without the use of an SOI, respectively.
Figure 16B:
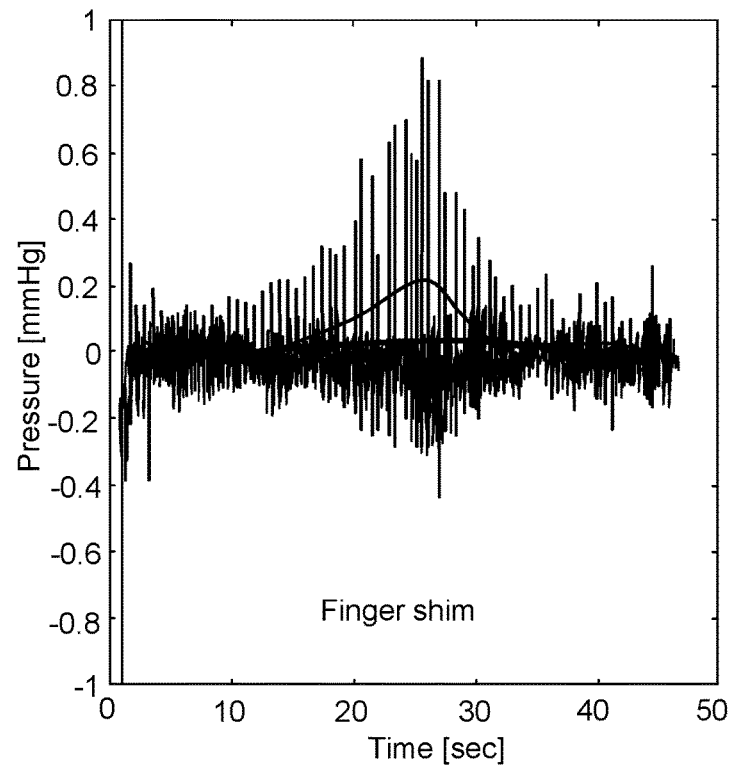

FIGS. 16A and 16B illustrate pressure sensor amplitude data, as measured in the inflatable measurement bladder, during inflation and deflation, without the use of an SOI (FIG. 16A) and with the use of an SOI in conjunction with VSMD embodiments such as disclosed herein (FIG. 16B). It will be seen that use of the embodiments such as described herein significantly and substantially improve blood pressure measurement results.

Figure 17:
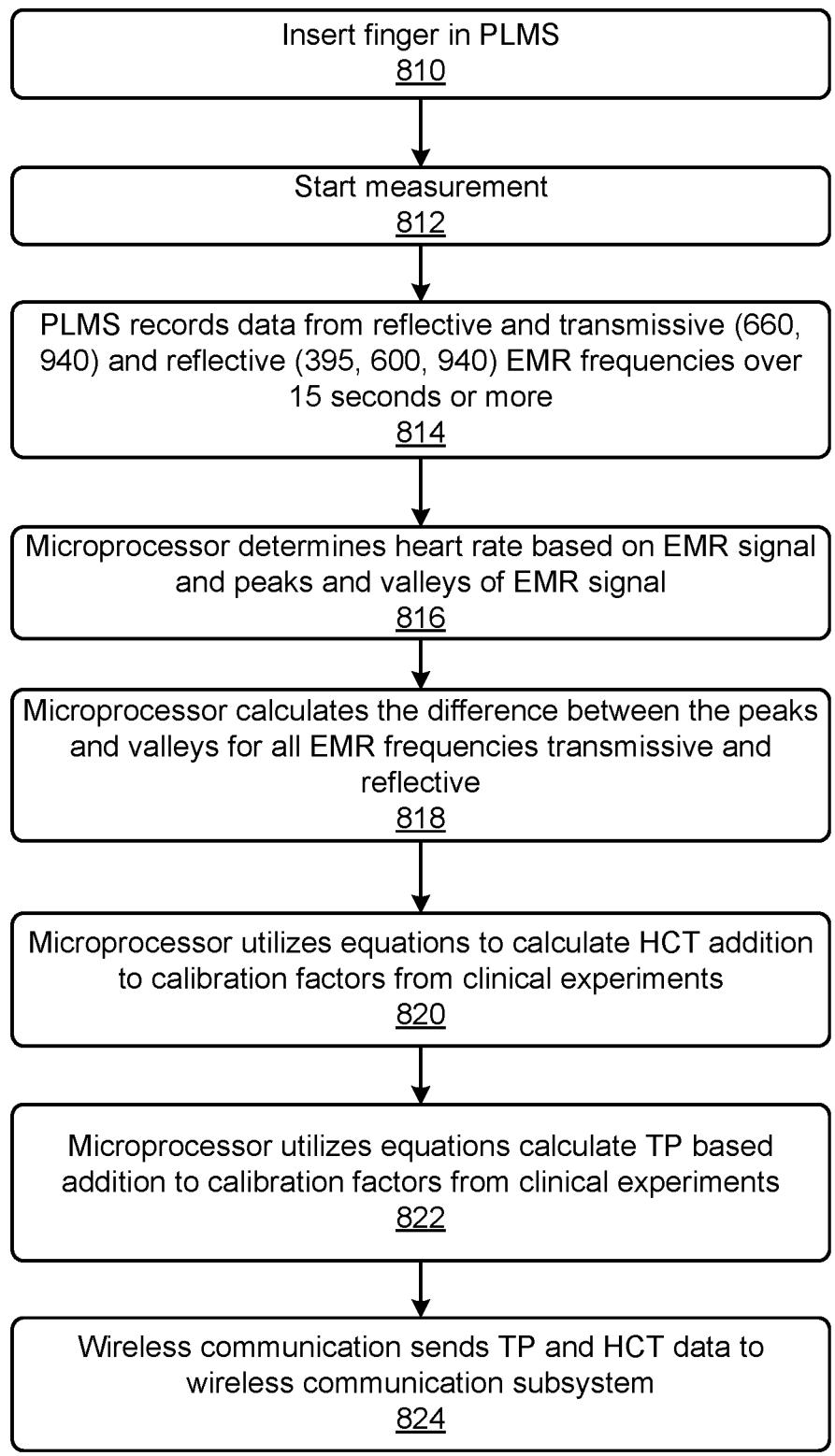
FIG. 17 illustrates a method for measuring Hc and TP via the PLMS.

FIG. 17 illustrates a process flow for measuring Hc and TP employing the systems and methods described herein. After a finger has been inserted into the PLMS (810), measurements may begin (812) either automatically by way of finger detection using a proximity sensor, or via user initiation. Thereafter, the PLMS records transmissive and reflective data from the detectors for a period of 15 seconds or more (814). The microprocessor determines heart rate (816) and calculates differences between peaks and valleys in the detected EMR data (818). The microprocessor then calculates Hc (820) and TP (822) and described above. The TP and Hc are then transmitted to a communications subsystem (824). Further details are set forth in the 014 patent.

Figure 18:
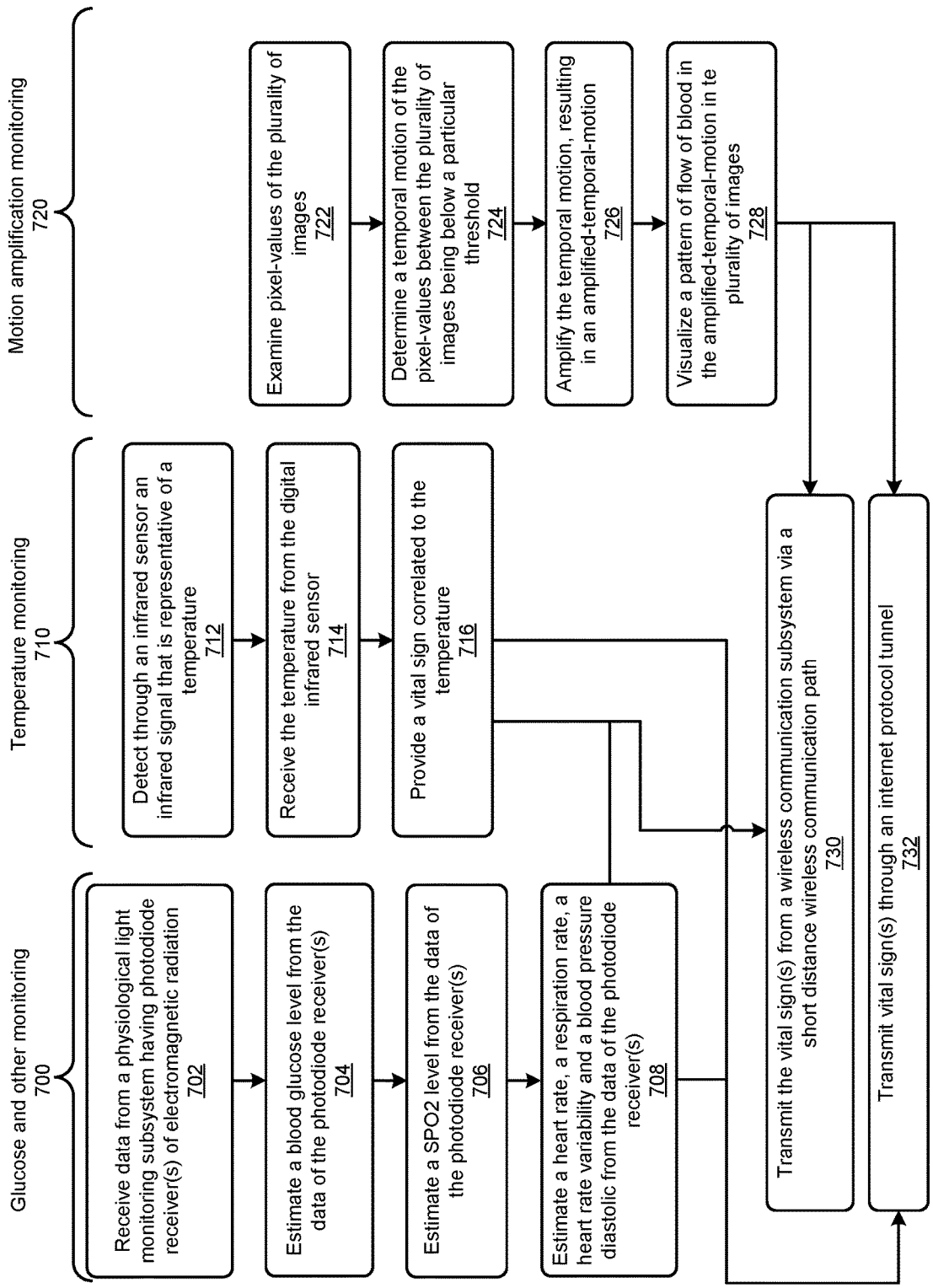
FIG. 18 illustrates a method for measuring glucose and other physiological characteristics via the PLMS.

Referring to FIG. 18, method 700, may be used for measuring blood glucose and other physiological characteristics/vital signs include receiving data from a SpO₂/glucose subsystem having photodiode receivers of ER (702). One example of the SpO₂/glucose subsystem is PLMS 204. Blood glucose levels and SpO₂ can be derived via the data received from the detector 222 (704, 706). Heart rate, respiration rate, heart rate variability and DBP may also be derived (708). Method 710 may be used for detecting an infrared signal that is representative of a body surface temperature (712), receiving the body surface temperature from the infrared sensor (714), and providing a data such as body core temperature correlated to the body surface temperature (716). Method 720 may be used to examine pixel values of a plurality of images (722) of the finger, determining a temporal motion of the pixel values between the plurality of images being below a particular threshold (724), amplifying the temporal motion, resulting in an amplified temporal motion (726), and visualizing a pattern of flow of blood in the amplified temporal motion in the plurality of images (728).

The measured vital signs may be transmitted from a communication subsystem, e.g., via a short distance wireless communication path (730), and/or securely to a RPMS (732).

Measurement of Hc and TP may also employ the PLMS and an alternate version of method 700. In this case, data from a reflective 395 nm emitter is used to calculate TP via a ratio with data from a reflective 940 nm emitter on side of the finger opposite the fingernail. The hematocrit is calculated via the transmissive 660 nm and 940 nm signals via the equation below where $f_w$ and $f_{pp}$ are parameters established through clinical trial calibration with the patients.

$$\frac{1}{H} \cong \frac{0.34}{1 - f_w - f_{pp}} \left(1 + R \frac{\mu_a^{Hb}(\lambda_1) + \Delta\mu_s(\lambda_1)}{\mu_a^w(\lambda_2) + \Delta\mu_s(\lambda_2)}\right).$$

where:
H is the hematocrit value (Hc);
$f_w$ is the tissue water fraction;
$f_{pp}$ is the plasma protein fraction;
R is the ratio of magnitudes of the blood pulse spectrum;
μaHb (λ1) is the sum of the absorption coefficient of the two forms of hemoglobin at a first wavelength;
μaw (λ2) is the absorption coefficient of water at a second wavelength;
Δμs (λ1) is the difference between the scattering coefficients of the blood and surrounding tissue at a first wavelength;
Δμs (λ2) is the difference between the scattering coefficients of the blood and surrounding tissue at a second wavelength; and
0.34 is the fraction of the red cell volume occupied by hemoglobin, which is assumed to be constant.

The VSMD's described herein may be equipped to communicate with a smartphone, via wired (USB port connection) or wireless (Bluetooth, WiFi, etc.) having an appropriate app installed thereon. Via the app, data can be uploaded from the VSMD to the smartphone for use by the app, and/or can be further uploaded to the RPMS. Via the app, firmware updates, feature upgrades, etc., to the VSMD may also be carried out.

The apparatuses, systems and methods described herein may be embodied in other specific forms without departing from the spirit or essential attributes thereof. Accordingly, reference should be made to the appended claims, rather than the foregoing specification, for indicating the scope of the innovations described herein.

The invention claimed is:

1. An apparatus for measuring blood pressure via a pad on the underside of a human finger, comprising:
   a. a flexible, arcuate, inflatable blood pressure measurement bladder ("measurement bladder") having a surface adapted to contact the underside of the finger, defining a finger pad contact surface and being adapted to apply pressure to the finger pad when inflated;
   b. adjustable force application structure ("force structure"), separate from the measurement bladder, adapted to adjustably apply a force to a portion of an upper side of the finger opposite the finger pad and press the finger pad against the finger pad contact surface;
   c. a measurement bladder pump in pneumatic communication with the measurement bladder for inflating the bladder;
   d. a relief valve in pneumatic communication with the measurement bladder for deflating the measurement bladder;
   e. a pressure sensor for providing data indicative of air pressure in the measurement bladder;
   f. a control system for receiving the data from the pressure sensor and for controlling the operation of the measurement bladder pump and relief valve, and comprising a microprocessor and program instructions stored in a memory for:
      i. inflating the measurement bladder such that the finger pad contact surface is urged against the finger pad and the upper side of the finger is urged against the force structure;
      ii. stopping measurement bladder inflation when a predetermined inflation pressure, that has been determined to substantially stop the flow of blood in arteries of the finger pad (inflation pressure), has been reached and thereafter controllably deflating the measurement bladder;
      iii. detecting resumption of blood flow in the arteries by monitoring the pressure data and detecting oscillations therein;
      iv. detecting when normal flow has resumed via the pressure oscillations, and the pressure at which normal blood flow resumes (deflation pressure); and,
      v. calculating an indication of blood pressure based on the inflation and deflation pressures.

2. The apparatus of claim 1 further comprising a substantially rigid arcuate cradle, the measurement bladder having an underside, opposite the finger pad contact surface, secured to the cradle such that the measurement bladder substantially conforms to the shape of at least a portion of the arc of the cradle.

3. The apparatus of claim 2 further comprising a slotted structure disposed on one side of the cradle and wherein the force structure comprises a hook and latch fastening strap secured to an opposing side of the cradle, the fastening strap adapted to be looped over a finger that has been placed in the cradle, through the slotted structure, and back over and fastened to itself so as to apply the force to the finger.

4. The apparatus of claim 3 wherein the force structure further comprises an arcuate cap flexibly connected to the cradle and adapted to form a closure over the cradle so as to define a cavity adapted to allow receipt of the finger between an inner surface of the cap and the finger pad contact surface, the fastening strap extending over an outermost surface of the cap such that the strap applies the force to the finger via the cap.

5. The apparatus of claim 4 wherein the cap is hinged to one side of the cradle such that the cap may be rotated to expose the finger pad contact surface and allow receipt of the finger.

6. The apparatus of claim 4 wherein the cap is flexibly connected to opposing sides of the cradle so as to allow up and down movement of the cap relative to the measurement bladder.

7. The apparatus according to claim 2 wherein the force structure comprises one or more shims and wherein the arc of the cradle forms a complete circle so as to define a cavity, the measurement bladder being disposed only in a bottom portion of the cavity, an upper portion of the cavity being adapted to receive one or more of the shims.

8. The apparatus according to claim 2 wherein the force structure comprises a bladder separate and independent of the measurement bladder ("force application bladder") and wherein arc of the cradle forms a complete circle so as to define a cavity, the measurement bladder being disposed only in a bottom portion of the cavity, the force application bladder being disposed in an upper portion of the cavity, such that inflation of the force application bladder presses the finger against the finger pad contact surface.

9. The apparatus of claim 8 further comprising a force application bladder pump, separate and independent of the measurement bladder pump, for inflating the force application bladder.

10. The apparatus of claim 9 wherein the force application bladder pump comprises a syringe pneumatically coupled to the force application bladder.

11. The apparatus of claim 9 wherein the force application pump comprises a bolus pump integral with the cradle.

12. The apparatus of claim 2 wherein the force structure comprises an arcuate cap flexibly connected to the cradle and adapted to form a closure over the cradle so as to define a cavity adapted to allow receipt of the finger between an inner surface of the cap and the finger pad contact surface, a strap extending from one side of the cavity, over or through the cap to an opposing side of the cavity, and an adjustment mechanism adapted control a tension applied to the cap via the strap and thereby apply the force pressure.

13. The apparatus of claim 2 wherein the force structure is adapted to apply sufficient pressure to the upper side of the finger so as to limit lateral movement of the finger pad to a range of about 0.4 mm to about 4 mm relative to the finger pad contact surface.

14. The apparatus according to claim 13 further comprising a light emitting and light detecting system (PLMS) for detecting amounts of light transmitted through and reflected from a forefinger portion of the finger, and program instructions for calculating indications of vital signs based on the amounts of detected transmitted and reflected light, the other indications comprising one or more of blood glucose level, respiration rate, saturation of peripheral oxygen, blood flow, total hemoglobin, pleth variability index, methemoglobin, acoustic respiration rate, carboxyhemoglobin, oxygen reserve index, oxygen content, nitric oxide, microvascular blood flow, EEG hematocrit, and total protein, the PLMS comprising a housing for receiving the finger disposed on the top of the base in substantial axial alignment with the cradle such that BP measurements are taken at a proximal end of the finger and the PLMS measurements are taken at a distal end of the finger, the cradle, the PLMS, the measurement bladder pump, measurement relief valve, force structure and control system being a single integral, self-contained, stand-alone unit.

15. The apparatus of claim 1 wherein there are no electromagnetic radiation (EMR) sensors employed to provide the indication of blood pressure and no EMR data is employed to calculate the indication of blood pressure.

16. The apparatus of claim 1 wherein the blood pressure indication is calculated based solely on the pressure data measured from the pressure sensor.

17. The apparatus of claim 1 further comprising a light emitting and light detecting system for detecting amounts of light transmitted through and reflected from a forefinger portion of the finger, and program instructions for calculating indications of vital signs based on the amounts of detected transmitted and reflected light, the other indications comprising one or more of blood glucose level, respiration rate, saturation of peripheral oxygen, blood flow, total hemoglobin, pleth variability index, methemoglobin, acoustic respiration rate, carboxyhemoglobin, oxygen reserve index, oxygen content, nitric oxide, microvascular blood flow, EEG hematocrit, and total protein.

18. The apparatus of claim 1 wherein the surface of the measurement bladder is adapted to contact no more than the underside of the finger.

19. An apparatus for measuring blood pressure (BP) of a person via a pad of the underside of a finger comprising:
   a) a base having a top and a bottom;
   b) a substantially inflexible arcuate cradle affixed to the top of the base so as to facilitate receipt of the finger;
   c) a flexible inflatable blood pressure measurement bladder ("measurement bladder") having an underside secured to the cradle such that the measurement bladder substantially conforms to the shape of at least a portion of the arc of the cradle, an upper side of the bladder defining a finger pad contact surface and being adapted to apply pressure to the finger pad when inflated;
   d) adjustable force application structure ("force structure"), separate from the measurement bladder, adapted to adjustably apply a force to an upper side of the finger and press the finger pad against the finger pad contact surface sufficient to limit lateral movement of the finger pad relative to the finger pad contact surface to a range of about 0.4 mm to about 4 mm;
   e) a measurement bladder pump and a measurement bladder relief valve for inflating and deflating the measurement bladder, respectively, a pressure sensor for providing data indicative of air pressure and air pressure oscillations in the measurement bladder, each of the measurement bladder pump, measurement bladder relief valve and pressure sensor disposed in the base;
   f) there being no light emitter or detector systems employed to provide an indication of BP;
   g) a control system disposed in the base and coupled to the measurement bladder pump, the measurement bladder relief valve and the pressure sensor, the control system including a microprocessor and a memory having program instructions for execution by the microprocessor stored therein for controlling the operation of the measurement bladder pump and the measurement bladder relief valve and for processing data received from the pressure sensor and to:

i. inflate the measurement bladder such that the finger pad contact surface is urged against the finger pad and the upper side of the finger is urged against the force structure;

ii. stop measurement bladder inflation when a predetermined inflation pressure, that has been determined to substantially stop the flow of blood in arteries of the finger pad (inflation pressure), has been reached and thereafter controllably deflating the measurement bladder;

iii. detect resumption of blood flow in the arteries by monitoring the pressure data and detecting pressure oscillations therein;

iv. detect when normal flow has resumed via the pressure oscillations, and the pressure at which normal blood flow resumes (deflation pressure); and, v. calculate an indication of blood pressure based on the inflation and deflation pressures by generating a heart rate power spectrum from the waveform, then next convolving the power spectrum, and then next apply a fixed ratio method to provide an indication of systolic and diastolic BP wherein none of steps g(i)-g(v) employ data from a light emitter or a light detector.

20. The apparatus according to claim 19 wherein the force structure comprises a slotted structure disposed on one side of the cradle and a hook and latch fastening strap secured to an opposing side of the cradle, the fastening strap adapted to be looped over a finger that has been placed in the cradle, through the slotted structure, and back over and fastened to itself so as to apply the force to the finger.

21. The apparatus according to claim 19 wherein the force structure comprises an arcuate cap flexibly connected to the cradle and adapted to form a closure over the cradle so as to define a cavity adapted to allow receipt of the finger between an inner surface of the cap and the finger pad contact surface, the fastening strap extending over an outermost surface of the cap such that the strap applies the force to the finger via the cap.

22. The apparatus according to claim 19 wherein the force structure comprises one or more accurate shims, wherein the arc of the cradle forms a complete circle so as to define a cavity, the measurement bladder being disposed only in a bottom portion of the cavity, an upper portion of the cavity being adapted to receive one or more of the shims.

23. The apparatus according to claim 19 wherein the force structure comprises a bladder separate and independent of the measurement bladder ("force application bladder") and wherein the arc of the cradle forms a complete circle so as to define a cavity, the measurement bladder being disposed only in a bottom portion of the cavity, the force application bladder being disposed in an upper portion of the cavity, such that inflation of the force application bladder presses the finger against the finger pad contact surface.

24. The apparatus according to claim 19 wherein the force structure comprises an arcuate cap flexibly connected to the cradle and adapted to form a closure over the cradle so as to define a cavity adapted to allow receipt of the finger between an inner surface of the cap and the finger pad contact surface, a strap extending from one side of the cavity, over or through the cap to an opposing side of the cavity, and an adjustment mechanism adapted control a tension applied to the cap via the strap and thereby apply the force pressure.

25. A method of using an apparatus that comprises:

a. a substantially inflexible arcuate cradle;

b. a flexible, arcuate, inflatable blood pressure measurement bladder ("measurement bladder") having an underside secured to the cradle such that the measurement bladder substantially conforms to the shape of at least a portion of the arc of the cradle, an upper side of the bladder defining a finger pad contact surface and being adapted to apply pressure to a human finger pad when inflated;

c. a measurement bladder pump in pneumatic communication with the measurement bladder for inflating the bladder;

d. a relief valve in pneumatic communication with the measurement bladder for deflating the measurement bladder;

e. a pressure sensor for providing data indicative of air pressure in the measurement bladder;

f. a control system for receiving the data from the pressure sensor and for controlling the operation of the measurement bladder pump and relief valve, and comprising a microprocessor and program instructions stored in a memory for:

i. inflating the measurement bladder such that the finger pad contact surface is urged against the finger pad;

ii. stopping measurement bladder inflation when a predetermined inflation pressure, that has been determined to substantially stop the flow of blood in arteries of the finger pad (inflation pressure), has been reached and thereafter controllably deflating the measurement bladder;

iii. detecting resumption of blood flow in the arteries by monitoring the pressure data and detecting oscillations therein;

iv. detecting when normal flow has resumed via the pressure oscillations, and the pressure at which normal blood flow resumes (deflation pressure); and, v. calculating an indication of blood pressure based on the inflation and deflation pressures;

the method comprising:

g. inserting a finger into the cradle such that the finger pad contacts the finger pad contact surface;

h. applying a force to a portion of the finger opposite the finger pad, so as to urge the finger pad against the finger pad contact surface, in an amount no more than is required to prevent the finger from moving no more than about 0.4 mm and less than about 4 mm laterally with respect to the finger pad contact surface; and i. causing the control system to initiate an operation that carries out steps (f(i)-f(v).

* * * * *